United States Patent
Ibrahim et al.

(10) Patent No.: US 12,516,236 B1
(45) Date of Patent: Jan. 6, 2026

(54) METHOD OF OIL RECOVERY FROM SUBSURFACE RESERVOIRS USING IMPROVED CARBON DIOXIDE ENHANCED OIL RECOVERY

(71) Applicant: King Fahd University of Petroleum and Minerals, Dhahran (SA)

(72) Inventors: Ahmed Mohamed Farid Ibrahim, Dhahran (SA); Khaled Zidan Ibrahim, Dhahran (SA); Mohammed Abdul-Raheem Al-Hakami, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/219,804

(22) Filed: May 27, 2025

Related U.S. Application Data

(60) Provisional application No. 63/726,186, filed on Nov. 27, 2024.

(51) Int. Cl.
  *C09K 8/594* (2006.01)
  *C09K 8/524* (2006.01)
  *E21B 43/16* (2006.01)

(52) U.S. Cl.
  CPC .............. *C09K 8/524* (2013.01); *C09K 8/594* (2013.01); *E21B 43/164* (2013.01)

(58) Field of Classification Search
  CPC . C09K 8/52; C09K 8/524; C09K 8/58; C09K 8/594; E21B 43/16; E21B 43/164; E21B 43/166; E21B 43/168
  (Continued)

(56) References Cited

U.S. PATENT DOCUMENTS

| | | | |
|---|---|---|---|
| 9,550,936 B2 | 1/2017 | Mazyar et al. | |
| 2014/0045732 A1* | 2/2014 | Mazyar | C09K 8/58 |
| | | | 166/305.1 |

(Continued)

FOREIGN PATENT DOCUMENTS

| CN | 104265252 B | 7/2017 |
|---|---|---|
| CN | 113652219 B | 3/2022 |

OTHER PUBLICATIONS

Ghosh et al., Application of Ionic Liquids in Upstream oil Industry—A Review, Int J Petrochem Res. 2017; 1(1): 50-60. (Year: 2017).*

(Continued)

*Primary Examiner* — Angela M DiTrani Leff
(74) *Attorney, Agent, or Firm* — Oblon, McClelland, Maier & Neustadt, L.L.P.

(57) ABSTRACT

A method of reducing a minimum miscibility pressure (MMP) of a hydrocarbon fluid in a subterranean geologic formation includes mixing an ionic liquid with the hydrocarbon fluid by injecting a composition, including the ionic liquid, into the subterranean geologic to form a first mixture. The first mixture includes a crude oil, $CO_2$, water, and the ionic liquid, where the crude oil has a total concentration of asphaltenes of at least 5 percent by weight (wt. %) based on the total weight of the crude oil. The ionic liquid is added to the hydrocarbon fluid in an amount effective to reduce the minimum miscibility pressure (MMP) of the hydrocarbon fluid by at least 10% and or to reduce the first contact miscibility pressure (FCMP) of the hydrocarbon fluid by at least 10%.

20 Claims, 13 Drawing Sheets

(58) Field of Classification Search
USPC .................................................. 166/305.1
See application file for complete search history.

(56) References Cited

U.S. PATENT DOCUMENTS

2015/0034310 A1* 2/2015 Brennecke ............. C09K 8/594
166/250.12
2015/0096755 A1* 4/2015 Martucci ................ C09K 8/594
166/305.1

OTHER PUBLICATIONS

Meng et al., Comprehensive Review of the Determination and Reduction of the Minimum Miscibility Pressure during CO2 Flooding, ACS Omega 2024, 9, 14747-14765 (Year: 2024).*
Leyva et al., Chemical characterization of asphaltenes from various crude oils, Fuel Processing Technology 106 (2013) 734-738 (Year: 2013).*
Ma et al. Structural analysis of petroleum acids in highly acidic crude oil and deacidification using organic amines, Fuel, 360, 2024, 130117 (Year: 2023).*
Bisweswar Ghosh, et al., "Ionic liquid in stabilizing asphaltenes during miscible CO2 injection in high pressure oil reservoir", Journal of Petroleum Science and Engineering, vol. 180, Jun. 6, 2019, pp. 1046-1057.
Yu-Feng Hu, et al., "Effect of the Structures of Ionic Liquids and Alkylbenzene-Derived Amphiphiles on the Inhibition of Asphaltene Precipitation from CO2-Injected Reservoir Oils", Langmuir, vol. 21, Issue 18, Aug. 6, 2005, pp. 8168-8174, Abstract Only, 2 pages.

* cited by examiner

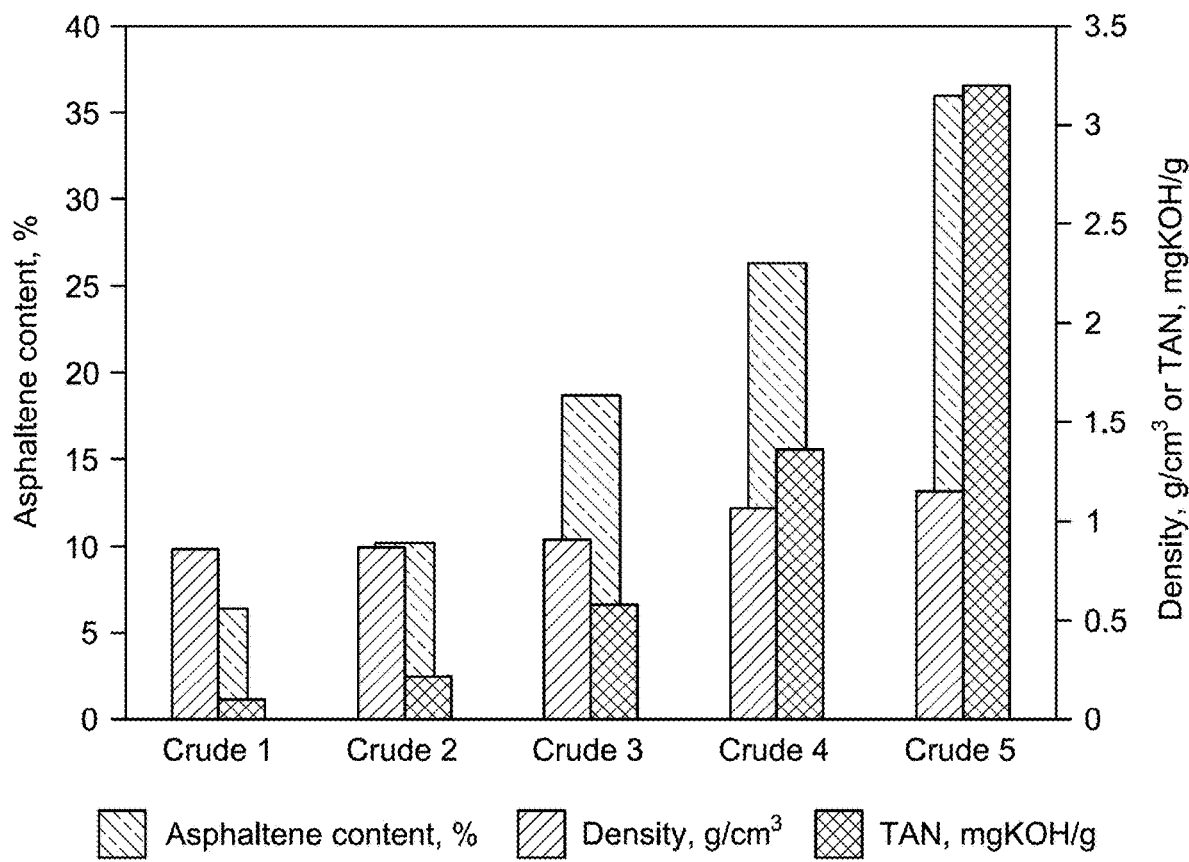
FIG. 1
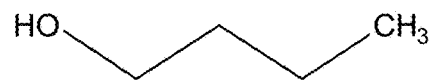
FIG. 2
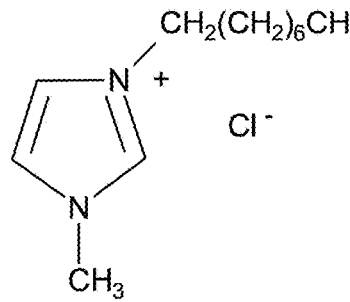 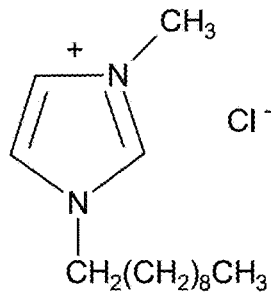
FIG. 3A                    FIG. 3B

METHOD OF OIL RECOVERY FROM SUBSURFACE RESERVOIRS USING IMPROVED CARBON DIOXIDE ENHANCED OIL RECOVERY

CROSS REFERENCE TO RELATED APPLICATION

This application claims the benefit of U.S. Provisional Application No. 63/726,186, filed Nov. 27, 2024, which is incorporated herein by reference in its entirety.

STATEMENT REGARDING PRIOR DISCLOSURE BY THE INVENTORS

Aspects of the present disclosure are described in Al-Hakami, M.; Ibrahim, A.; Abdelgawad, K., "Applications of ionic liquids in improving $CO_2$ miscibility in crude oil for enhanced oil recovery and $CO_2$ sequestration applications" published in Volume 219, The Journal of Supercritical Fluids, which is incorporated herein by reference in its entirety.

BACKGROUND

Technical Field

The present disclosure is directed towards enhanced oil recovery techniques from subsurface reservoirs, and more particularly, relates to a method of reducing a minimum miscibility pressure (MMP) of a hydrocarbon fluid in a subterranean geologic formation.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present disclosure.

With the advent of industrial civilization, global energy demand has increased multifold. The growing global energy demand has increasingly relied on oil and other hydrocarbon resources, which remain the most viable option for meeting the global energy demand due to high availability, high energy density, and well-established infrastructure for extraction and distribution of oil and hydrocarbon. However, oil demand is projected to rise, making hydrocarbons insufficient for future energy requirements [Ahmad, T., et al., A critical review of comparative global historical energy consumption and future demand: The story told so far, Energy Reports, Volume 6, 2020, pages 1973-1991]. Extensive hydrocarbon deposits are found worldwide, referred to as reservoirs. The hydrocarbon industry plays a pivotal role in recovering oil and natural gas trapped in subterranean reservoirs. Advanced techniques, such as drilling, hydraulic fracturing, and enhanced oil recovery, have improved extraction efficiency. Hydrocarbons and other fluid resources, like water, may be brought to the surface from these formations through wellbores or open holes drilled into the earth, providing access to subsurface reservoirs. Efficient production of hydrocarbons depends on proper functioning of production facilities. A common issue causing structural failure and inefficiency is the formation of deposits in wellbores, tubing, flow lines, storage tanks, separators, and within the reservoir rock pores, which may disrupt production.

Therefore, it is desirable to continually explore and expand hydrocarbon reserves. Oil recovery processes are categorized into primary, secondary, and tertiary recovery or enhanced oil recovery (EOR). The primary recovery method involves natural flow using reservoir pressure and gravity, along with artificial lifting through pumps, recovering about 20% of crude oil. The combined contribution of primary and secondary recovery to oil in-place recovery ranges from approximately 40% to 50% [Almobarak, M. et al., A review of chemical-assisted minimum miscibility pressure reduction in $CO_2$ injection for enhanced oil recovery, Petroleum, Volume 7, Issue 3, 2021, pages 245-253]. However, a large amount of crude oil remains in the reservoir, requiring the use of LOR methods to extract additional oil from more challenging sections. LOR methods, including thermal, chemical, and miscible methods, further enhance recovery, particularly for heavier oils or those without a primary recovery phase. Waterflooding, a common secondary method, injects water to displace oil, while LOR techniques aim to restore reservoir pressure and improve oil displacement, minimizing residual oil saturation. LOR techniques include thermal methods, such as steam stimulation, steam flooding, and in situ combustion; gas injection methods, such as miscible or immiscible, depending on the minimum miscibility pressure (MMP) between injected gases like carbon dioxide ($CO_2$), nitrogen ($N_2$), or flue gases and crude oil; chemical methods, such as polymer, alkaline, and surfactant injections; and biotechnological methods. Compared to immiscible flooding, miscible $CO_2$ injection enhances sweep efficiency and reduces $CO_2$-oil interfacial tension, potentially increasing oil recovery by up to 10% [Dong, X., et al., Enhanced oil recovery techniques for heavy oil and oilsands reservoirs after steam injection, Applied Energy, Volume 239, 2019, pages 1190-1211]. As observed, enhanced heavy oil recovery is primarily achieved through steam injection or in-situ combustion. However, heat loss occurs during steam injection into deep reservoirs, and early steam breakthrough due to steam channeling at producing wells may limit oil recovery. This process may not be economically feasible. Further, in-situ combustion has several drawbacks, including poor process control, resulting in low sweep efficiency, and well completions being negatively affected by the ignition. Additionally, the procedure is more complex than other thermal technologies, requiring a larger manual resource. The aforementioned imitations have prompted the search for more viable alternatives Gas injection, a widely used EOR method, depends on factors like the type of injected gas, its minimum miscibility pressure (MMP), and reservoir conditions [Chen, H., et al., Effect of gas contamination and well depth on pressure interval of $CO_2$ near-miscible flooding, J Pet Sci Eng, vol. 176, 2019, pp. 43-50]. $CO_2$ flooding may be miscible or immiscible, with miscible injection enhancing displacement efficiency. If injection pressure is below the MMP, oil swelling contributes to recovery. Miscible $CO_2$ injection has proven more efficient, but achieving miscibility in high-pressure reservoirs risks fracturing the formation, which may damage the reservoir and reduce production rates [Voon, C., et al., Reduction of MMP using oleophilic chemicals, *International Journal of Chemical and Molecular Engineering*, vol 8, 4, 2014].

In high-pressure, high-temperature reservoirs, $CO_2$ miscibility is challenging. Reducing the MMP can aid in enhancing recovery and avoiding fracturing. Examinations have explored using chemicals like fatty acids, alcohols, and surfactants to achieve this. Researchers improved the solubility of $CO_2$ in crude oil by using carboxylic acid (fatty acids) [Qayyimah, A. et al., Fatty acid methyl ester from rubber seed oil as additives in reducing the minimum miscibility pressure of $CO_2$ and crude oil, *Journal of Applied Sciences*, vol 16, 11, 2016, 542-548]. Despite using a high quantity of fatty acids, the reported MMP decrease is recognized as small in comparison to other utilized chemical additives such as non-ionic surfactants or alcohols. Alcohol was utilized as chemical to lower MMP in $CO_2$-oil system. Moradi and coworkers investigated the reduction of MMP between $CO_2$ and dead crude oil with a 37.8 American petroleum institute (API) degree value. Their findings showed that tested alcohols may lower the interfacial tension (IFT) between $CO_2$ and crude oil. Additionally, compared to linear alcohols with the same number of carbons, branched alcohols had a greater IFT reduction [Moradi, B., et al., Effects of alcohols on interfacial tension between carbon dioxide and crude oil at elevated pressures and temperature, Journal of Petroleum Science and Engineering, Volume 121, 2014, pages 103-109]. Yang and coworkers examined MMP reduction in the $CO_2$-oil system by adding 5 weight percent (wt. %) monohydric alcohols and a 5% alcohol mixture to crude oil. They found that increasing the carbon chain length of the alcohol enhanced $CO_2$ solubility, reducing MMP by 9.21% compared to the initial sample without alcohols [Yang, Z., et al., Reducing the minimum miscibility pressure of CO2 and crude oil using alcohols, Colloids and *Surfaces A: Physicochemical and Engineering Aspects*, volume 568, 2019, pages 105-112].

Recent advancements in oil recovery have improved extraction efficiency for heavy crude oils. However, challenges remain, such as the risk of reservoir fracturing during high-pressure $CO_2$ injection, economic feasibility issues with steam injection, and environmental concerns. These challenges emphasize the need for continued research to develop more efficient, sustainable, and cost-effective recovery methods.

Accordingly, one object of the present disclosure is to provide a method of reducing minimum miscibility pressure (MMP) in a subterranean formation to improve oil recovery, that may circumvent the drawbacks and limitations, such as, high operating pressures, insufficient miscibility, asphaltene precipitation, and excessive gas consumption, of the methods known in the art.

SUMMARY

In an exemplary embodiment, a method of reducing a minimum miscibility pressure (MMP) of a hydrocarbon fluid in a subterranean geologic formation is described. The method includes mixing an ionic liquid with the hydrocarbon fluid by injecting a composition, including the ionic liquid, into the subterranean geologic to form a first mixture. The first mixture includes a crude oil, $CO_2$, water, and the ionic liquid, where the crude oil has a total concentration of asphaltenes of at least 5 percent by weight (wt. %) based on the total weight of the crude oil. The ionic liquid is added to the hydrocarbon fluid in an amount effective to reduce the minimum miscibility pressure (MMP) of the hydrocarbon fluid by at least 10% and or to reduce the first contact miscibility pressure (FCMP) of the hydrocarbon fluid by at least 10%.

In some embodiments, the ionic liquid is selected from the group consisting of a 1-methyl-3-octylimidazolium chloride ($C_{12}H_{23}ClN_2$, [MOIM]Cl) and 1-decyl-3-methylimidazolium chloride ($C_{14}H_{27}ClN_2$, [DMIM]Cl), and the amount effective to reduce the MMP of the hydrocarbon fluid by at least 10% and or to reduce the FCMP of the hydrocarbon fluid by at least 10% is less than or equal to 1 wt. % of the hydrocarbon fluid.

In some embodiments, the ionic liquid is 1-methyl-3-octylimidazolium chloride.

In some embodiments, 1-methyl-3-octylimidazolium is added to the hydrocarbon fluid in an amount of 1 wt. % of the hydrocarbon fluid, and MMP of the hydrocarbon fluid is reduced by at least 17%.

In some embodiments, 1-methyl-3-octylimidazolium is added to the hydrocarbon fluid in an amount of 1 wt. % of the hydrocarbon fluid, and FCMP of the hydrocarbon fluid is reduced by at least 30%.

In some embodiments, 1-methyl-3-octylimidazolium is added to the hydrocarbon fluid in an amount of 0.1 wt. % of the hydrocarbon fluid, and MMP of the hydrocarbon fluid is reduced by at least 14%.

In some embodiments, 1-methyl-3-octylimidazolium is added to the hydrocarbon fluid in an amount of 0.1 wt. % of the hydrocarbon fluid, and FCMP of the hydrocarbon fluid is reduced by at least 14%.

In some embodiments, the ionic liquid is 1-decyl-3-methylimidazolium chloride.

In some embodiments, 1-decyl-3-methylimidazolium chloride is added to the hydrocarbon fluid in an amount of 1 wt. % of the hydrocarbon fluid, and MMP of the hydrocarbon fluid is reduced by at least 13%.

In some embodiments, 1-decyl-3-methylimidazolium chloride is added to the hydrocarbon fluid in an amount of 1 wt. % of the hydrocarbon fluid, and FCMP of the hydrocarbon fluid is reduced by at least 32%.

In some embodiments, 1-decyl-3-methylimidazolium chloride is added to the hydrocarbon fluid in an amount of 0.1 wt. % of the hydrocarbon fluid, and MMP of the hydrocarbon fluid is reduced by at least 12%.

In some embodiments, 1-decyl-3-methylimidazolium chloride is added to the hydrocarbon fluid in an amount of 0.1 wt. % of the hydrocarbon fluid, and FCMP of the hydrocarbon fluid is reduced by at least 21%.

In some embodiments, the mixing includes injecting the ionic liquid into a subterranean geologic formation including the crude oil, and injecting $CO_2$ into the subterranean geologic formation.

In some embodiments, the crude oil includes asphaltene in an amount of at least 10% by weight based on the total weight of the crude oil.

In some embodiments, the crude oil includes asphaltene in an amount of at least 30% by weight based on the total weight of the crude oil.

In some embodiments, the crude oil has a density in a range from 0.7 gram per cubic centimeter ($g/cm^3$) to 1.3 $g/cm^3$.

In some embodiments, the crude oil has a total acid number (TAN) less than or equal to 3.5 milligrams of KOH per gram (mgKOH/g).

In some embodiments, the crude oil has a TAN less than or equal to 1 mgKOH/g.

In some embodiments, the crude oil has a viscosity of less than or equal to 50,000 centipoises (cP).

In some embodiments, the method further includes determining an operating temperature of the hydrocarbon fluid, characterizing the crude oil based on a density and an asphaltene content of the crude oil at the operating temperature to obtain an oil category, adding the amount of the ionic liquid, an oil amount of the crude oil, and a water amount of the water, where the amount is determined based on the operating temperature and the oil category.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a comparison graph of crude 1, crude 2, crude 3, crude 4, and crude 5, utilized in the present disclosure, along with their properties at ambient conditions, according to certain embodiments.

FIG. 2 depicts a molecular structure of n-butanol (BL), according to certain embodiments.

FIG. 3A depicts a chemical structure of 1-methyl-3-octylimidazolium chloride ([MOIM]Cl), according to certain embodiments.

FIG. 3B depicts a chemical structure of 1-decyl-3-methylimidazolium chloride ([DMIM]Cl), according to certain embodiments.

DETAILED DESCRIPTION

Figure 4:
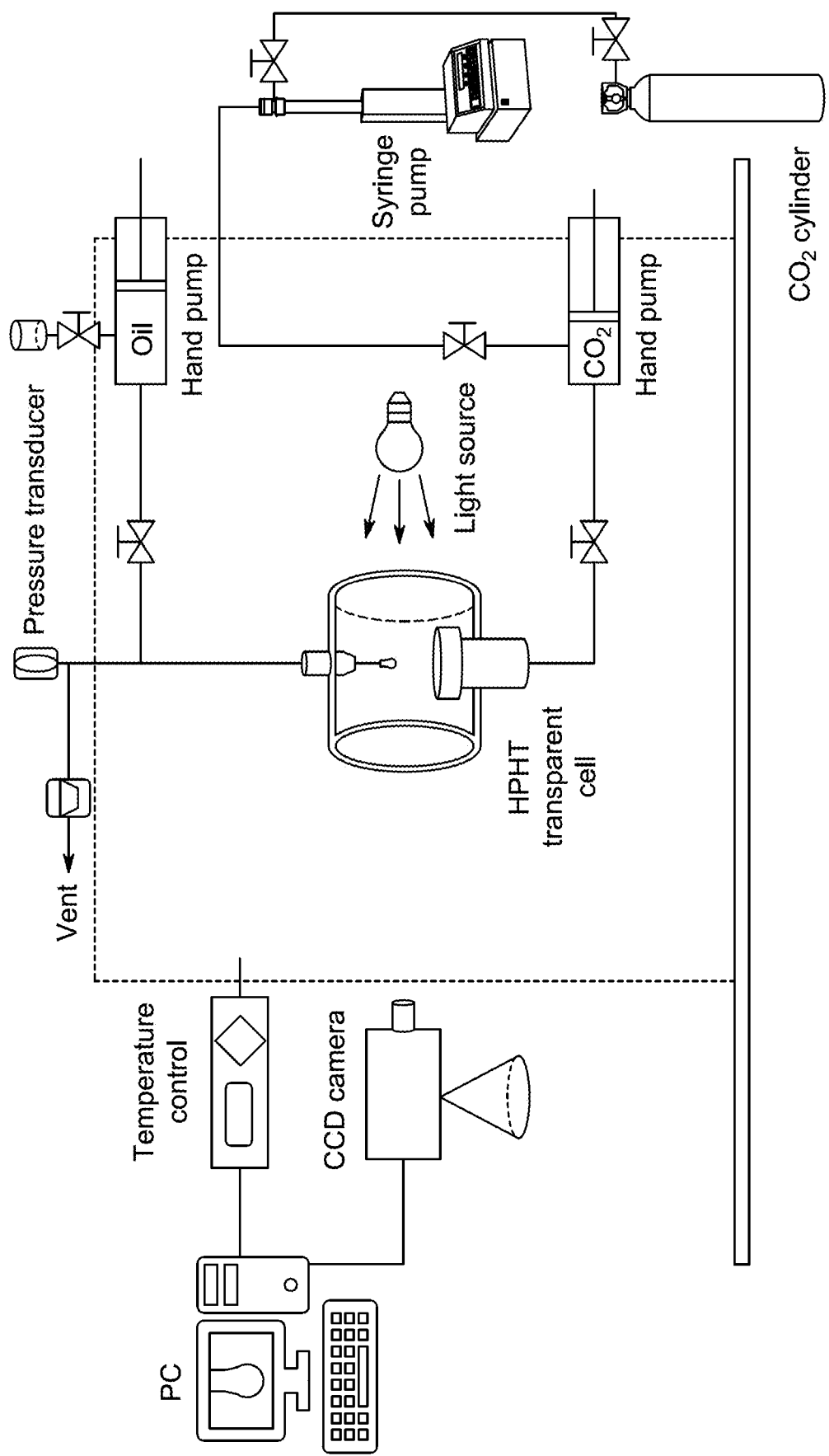
FIG. 4 is a schematic block diagram of a vanishing interfacial-tension technique (VIT) apparatus, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and lower limit values, it should be understood that any ranges obtainable by combining any upper limit or preferable value with any lower limit or preferable value are also specifically disclosed, irrespective of whether the obtained ranges are clearly mentioned in the context.

As used herein, the term 'subterranean geologic formation' refers to a large-scale geological feature that exists beneath the Earth's surface.

As used herein, the term 'minimum miscibility pressure (MMP)' refers to a pressure at which an injected fluid and reservoir fluid become miscible. MMP determines the pressure required to achieve miscibility between injected gas and the reservoir oil.

As used herein, the term 'first Contact Miscibility Pressure (FCMP)' refers to the lowest pressure at which the injected gas and reservoir oil can form a single phase upon initial contact.

As used herein, the term 'ionic liquid (IL)' refers to salts that are liquid at or near room temperature, including large organic cations and inorganic or organic anions. ILs are known for their low volatility, high thermal stability, and tunable properties. ILs can selectively absorb carbon dioxide ($CO_2$) and modify the phase behavior of $CO_2$-oil mixtures, potentially lowering MMP and improving $CO_2$ injection efficiency in oil reservoirs.

As used herein, the term 'hydrocarbon fluid' refers to a liquid or gas composed primarily of hydrocarbons, which are organic compounds made up of hydrogen and carbon atoms. These fluids can include crude oil, natural gas, or refined petroleum products like gasoline, diesel, and lubricants.

As used herein, 'crude oil' refers to a complex mixture of hydrocarbons, which are chemicals made up of hydrogen and carbon, and other organic and inorganic substances.

As used herein, 'enhanced oil recovery (EOR)' refers to a process for extracting oil that has not already been retrieved through the primary or secondary oil recovery techniques.

As used herein the term 'surfactant' refers to a compound that contains a lipophilic segment and a hydrophilic segment, which when added to water or solvents, reduces the surface tension of the system.

Exemplary cationic surfactants include, but are not limited to, alkyl primary, secondary, and tertiary amines, alkanolamides, quaternary ammonium salts, alkylated imidazolium, and pyridinium salts. Additional examples of cationic surfactants include primary to tertiary alkylamine salts such as, for example, monostearylammonium chloride, distearylammonium chloride, tristearylammonium chloride; quaternary alkylammonium salts such as, e.g., monostearyltrimethylammonium chloride, distearyldimethylammonium chloride, stearyldimethylbenzylammonium chloride, monostearyl-bis(polyethoxy)methylammonium chloride; alkylpyridinium salts such as, for example, N-cetylpyridinium chloride, N-stearylpyridinium chloride; N,N-dialkylmorpholinium salts; fatty acid amide salts such as, for example, polyethylene polyamine; and the like.

Exemplary anionic surfactants include alkyl sulfates, alkyl sulfonates, fatty acids, sulfosuccinates, and phosphates. Examples of anionic surfactants include anionic surfactants having a carboxyl group such as sodium salt of alkylcarboxylic acid, potassium salt of alkylcarboxylic acid, ammonium salt of alkylcarboxylic acid, sodium salt of alkylbenzenecarboxylic acid, potassium salt of alkylbenzenecarboxylic acid, ammonium salt of alkylbenzenecarboxylic acid, sodium salt of polyoxyalkylene alkyl ether carboxylic acid, potassium salt of polyoxyalkylene alkyl ether carboxylic acid, ammonium salt of polyoxyalkylene alkyl ether carboxylic acid, sodium salt of N-acylsarcosine acid, potassium salt of N-acylsarcosine acid, ammonium salt of N-acylsarcosine acid, sodium salt of N-acylglutamic acid, potassium salt of N-acylglutamic acid, ammonium salt of N-acylglutamic acid; anionic surfactants having a sulfonic acid group; anionic surfactants having a phosphonic acid; and the like.

Nonionic surfactant can include ethoxylated fatty alcohols, alkyl phenol polyethoxylates, fatty acid esters, glycerol esters, glycol esters, polyethers, alkyl polyglycosides, amine oxides, or a combination thereof. Exemplary nonionic surfactants include fatty alcohols (e.g., cetyl alcohol, stearyl alcohol, cetostearyl alcohol, oleyl alcohol, and the like); polyoxyethylene glycol alkyl ethers (e.g., octaethylene glycol monododecyl ether, pentaethylene glycol monododecyl ether, and the like); polyoxypropylene glycol alkyl ethers (e.g., butapropylene glycol monononyl ether); glucoside alkyl ethers (e.g., decyl glucoside, lauryl glucoside, octyl glucoside); polyoxyethylene glycol octylphenol ethers (e.g., Triton X-100 (octyl phenol ethoxylate)); polyoxyethylene glycol alkylphenol ethers (e.g., nonoxynol-9); glycerol alkyl esters (e.g., glyceryl laurate); polyoxyethylene glycol sorbitan alkyl esters (e.g., polysorbates such as sorbitan monolaurate, sorbitan monopalmitate, sorbitan monostearate, sorbitan tristearate, sorbitan monooleate, and the like); sorbitan alkyl esters (e.g., polyoxyethylene sorbitan monolaurate, polyoxyethylene sorbitan monopalmitate, polyoxyethylene sorbitan monostearate, polyoxyethylene sorbitan monooleate, and the like); cocamide ethanolamines (e.g., cocamide monoethanolamine, cocamide diethanolamine, and the like); amine oxides (e.g., dodecyldimethylamine oxide, tetradecyldimethylamine oxide, hexadecyl dimethylamine oxide, octadecylamine oxide, and the like); block copolymers of polyethylene glycol and polypropylene glycol (e.g., poloxamers available under the trade name Pluronics, available from BASF); polyethoxylated amines (e.g., polyethoxylated tallow amine); polyoxyethylene alkyl ethers such as polyoxyethylene stearyl ether; polyoxyethylene alkylene ethers such as polyoxyethylene oleyl ether; polyoxyalkylene alkylphenyl ethers such as polyoxyethylene nonylphenyl ether; polyoxyalkylene glycols such as polyoxypropylene polyoxyethylene glycol; polyoxyethylene monoalkylates such as polyoxyethylene monostearate; bispolyoxyethylene alkylamines such as bispolyoxyethylene stearylamine; bispolyoxyethylene alkylamides such as bispolyoxyethylene stearylamide; alkylamine oxides such as N,N-dimethylalkylamine oxide; and the like.

Zwitterionic surfactants (which include a cationic and anionic functional group on the same molecule) include, for example, betaines, such as alkyl ammonium carboxylates (e.g., $[(CH_3)_3N^+—CH(R)COO^-]$ or sulfonates (sulfo-betaines) such as $[RN^+(CH_3)_2(CH_2)_3SO_3^-]$, where R is an alkyl group). Examples include n-dodecyl-N-benzyl-N-methylglycine $[C_{12}H_{25}N^+(CH_2C_6H_5)(CH_3)CH_2COO^-]$, N-allyl N-benzyl N-methyltaurines $[C_nH_{2n-1}N^+(CH_2C_6H_5)(CH_3)CH_2CH_2SO_3^-]$.

As used herein, 'wettability' refers to the preference of a liquid to be in contact with a solid surrounded by another fluid (liquid or gas). It is controlled by the balance between the intermolecular interactions of adhesive type (liquid to surface) and cohesive type (liquid to liquid).

As used herein, 'interfacial tension' refers to the energy required to increase the surface area of a boundary between two immiscible phases, mostly two liquids. However, at a gas-liquid interface, it is called surface tension, and at a gas-solid interface, it is called surface free energy.

As used herein, the term 'total acid number (TAN)' refers to a measure of the number of acidic substances (such as carboxylic acids) present in a sample of oil or petroleum products. It is expressed in milligrams of potassium hydroxide per gram of a substance (mgKOH/g).

As used herein, the term 'emulsifier' refers to a substance that helps stabilize a mixture of two immiscible liquids, such as oil and water, by reducing surface tension. It forms a stable emulsion, preventing the liquids from separating.

As used herein, the term 'viscosity' refers to the resistance of a fluid to a change in shape or movement of neighboring portions relative to one another. It is expressed in centipoise (cP).

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{11}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward the impact of various ionic liquids (ILs) on reducing the MMP and the FCMP in $CO_2$-oil systems. 1-methyl-3-octylimidazolium chloride ([MOIM]Cl) and 1-decyl-3-methylimidazolium chloride ([DMIM]Cl) are preferred ILs, with [MOIM]Cl showcasing enhanced performance, particularly in reducing MMP.

One aspect of the present disclosure is directed towards a method of reducing a MMP of a hydrocarbon fluid in a subterranean geologic formation. The method includes mixing an IL with a hydrocarbon fluid by injecting a composition including the IL into the subterranean geologic to form a first mixture.

The ionic liquid can be used in a liquid or solid state and can be a liquid at a temperature effective to insert between planes of neighboring asphaltene particles or molecules. The cation of the ionic liquid can be acyclic or can include an aromatic ring, fused aromatic rings, or a heterocyclic ring. In a particular embodiment, a heteroatom in the heterocyclic ring is $N^+$, $S^+$, $P^+$, or a combination thereof. It is contemplated that increasing the number of fused aromatic rings further delocalizes the charge associated with the cationic species. These alkyl groups increase the miscibility of the surfactant (ionic liquid) with the hydrocarbon fluid.

According to an embodiment, the cation of the ionic liquid includes imidazolium, pyrazolium, pyridinium, ammonium, piperidinium, pyrrolidinium, sulfonium, phosphonium, morpholinium, quinolinium, isoquinolinium, indolium, thiazolium, benzothiazolium, cyclopropenylium, derivatives thereof, or a combination including at least one of the foregoing. According to an embodiment, the cation of the ionic liquid is functionalized with a group such as hydrogen, alkyl, alkyloxy, cylcloalkyl, aryl, alkaryl, aralkyl, aryloxy, aralkyloxy, alkenyl, alkynyl, amine, alkyleneamine, aryleneamine, hydroxy, carboxylic acid group or salt, sulfonic acid group or salt, halogen. Such groups can be, as appropriate given the group, unsubstituted or substituted with a heteroatom or halogen. Non-limiting examples of the counter anion to the cation of the ionic liquid include a halide (e.g., fluoride, chloride, bromide, iodide), tetrachloroaluminate ($AlCl_4^-$), hexafluorophosphate ($PF_6^-$), hexafluoroarsenate ($AsF_6^-$), tetrafluroborate ($BF_4^-$), triflate ($CF_3SO_3^-$), mesylate ($CH_3SO_3^-$), dicyanamide (($NC)_2N^-$), thiocyanate ($SCN^-$), alkylsulfate ($ROSO_3^-$, where R is a halogentated or non-halogenated linear or branched alkyl group, e.g., $CH_3CH_2OSO_3^-$), tosylate, bis(trifluoromethylsulfonyl)imide, alkyl sulfate ($ROSO_3^-$, where R is a halogentated or non-halogenated linear or branched alkyl group, e.g., $CF_2HCH_2OSO_3^-$), alkyl carbonate ($ROCO_2^-$, where R is a halogentated or non-halogenated linear or branched alkyl group), or a combination including at least one of the foregoing. Examples of the ionic liquid include, but are not limited to, 1-octyl-3-methylimidazolium trifluoromethanesulfonate, 1-hexyl-3-methylimidazolium trifluoromethanesulfonate, 1-butyl-3-methylimidazolium trifluoromethanesulfonate, 1-ethyl-3-methylimidazolium trifluoromethanesulfonate, N,N,N-tributyl-1-heptanaminium trifluoromethanesulfonate, N,N,N-tributyl-1-octanaminium trifluoromethanesulfonate, 1-dodecyl-3-methylimidazolium chloride, trihexyl(tetradecyl)phosphonium chloride, 1-hexyl-2-ethyl-3,5-dimethylpyridinium bis[(trifluoromethyl)sulfonyl]imide, N-butylisoquinolinium chloride, 1-hexyl-4-(4-methylpiperidino)pyridinium bromide, 1-butyl-1-methylpiperidinium bis(trifluoromethylsulfonyl)imide, 1,2,3-tris(diethylamino)cyclopropenylium dicyanamide, 1-hexyl-2-propyl-3,5-diethylpyridinium bis[(trifluoromethyl)sulfonyl]imide, benzothiazolium methanesulfonate, benzothiazolium trifluoromethanesulfonate, benzothiazolium p-toluenesulfonate, 2,3,3-trimethyl-1-propyl-3H-indolium iodide, 4-dodecyl-1-[(2-methylthiazol-4-yl)methyl]pyridinium chloride, 1-[(2-aminothiazol-4-yl)methyl]-2-decylpyridinium chloride, 1-[(2-acetylaminothiazol-4-yl)methyl]-4-dodecylpyridinium chloride, N-butylpyridinium chloride, and 1-butyl-3-methylimidazolium tetrafluoroborate. In some embodiments, the IL is selected from the group consisting of [MOIM]Cl, [DMIM]Cl, and combinations thereof. In a preferred embodiment, the IL is [MOIM]Cl. In another preferred embodiment, the IL is [DMIM]Cl.

In some embodiments, the mixing includes injecting the IL into a subterranean geologic formation including the crude oil, and injecting $CO_2$ into the subterranean geologic formation. In some embodiments, the first mixture includes a crude oil, $CO_2$, water and the IL. The mixture helps improve the flow of oil and enhance the efficiency of $CO_2$ injection for oil recovery.

In some embodiments, the crude oil has a total concentration of asphaltenes of at least 2%, preferably 5%, preferably 7%, preferably 9%, preferably 11%, preferably 13%, preferably 15%, preferably 17%, preferably 19%, preferably 21%, preferably 23%, preferably 25%, preferably 27%, preferably 29%, preferably 31%, preferably 33%, preferably 35%, and preferably 37% by weight based on the total weight of the crude oil. In some embodiments, the crude oil includes asphaltene in an amount of at least 10%, preferably 12%, preferably 14%, preferably 16%, preferably 18%, preferably 20%, preferably 22%, preferably 24%, preferably 26%, preferably 28%, preferably 30%, preferably 32%, preferably 34%, preferably 36%, and preferably 38% by weight based on the total weight of the crude oil. In some embodiments, the crude oil includes asphaltene in an amount of at least 30%, preferably 31%, preferably 32%, preferably 33%, preferably 34%, preferably 35%, preferably 36%, and preferably 37% by weight based on the total weight of the crude oil.

Asphaltene molecules are known to have a fused polyaromatic ring system and contain heteroatoms like sulfur, oxygen, and nitrogen, which may be part of the aromatic ring or other carbocyclic rings, linking groups, or functional groups. There are two primary structural motifs for asphaltenes: the continental and archipelago structures. In the continental structure, alkyl chains branch off a central polyaromatic ring system, typically composed of ten or more fused aromatic rings. In the archipelago structure, multiple polyaromatic ring systems are connected by alkyl chains, some of which may contain heteroatoms, with additional alkyl chains extending freely from the rings. Generally, the continental structure contains more fused aromatic rings than the archipelago structure.

The aromatic regions of asphaltenes, combined with heteroatoms, create polar regions, while the alkyl chains contribute hydrophobic regions. Asphaltenes may also feature polar functional groups, such as carbonyl, carboxylic acid, pyrrole, amide, phenol, and thiol. These molecules are thought to aggregate into micellar structures in oil, where the alkyl chains interact with the aliphatic components of the oil, and the aromatic or polar regions align towards the interior of the micelle. Precipitation occurs when the asphaltene concentration exceeds a critical micelle concentration.

In some embodiments, the IL is added to the hydrocarbon fluid in an amount effective to reduce the MMP of the hydrocarbon fluid by at least 5%, preferably 10%, preferably 11%, preferably 12%, preferably 13%, preferably 14%, preferably 15%, preferably 16%, preferably 17%, preferably 18%, preferably 19%, preferably 20% and or to reduce the FCMP of the hydrocarbon fluid by at least 5%, preferably 10%, preferably 12%, preferably 14%, preferably 16%, preferably 18%, preferably 20%, preferably 22%, preferably 24%, preferably 26%, preferably 28%, preferably 30%. In some embodiments, the amount effective to reduce the MMP of the hydrocarbon fluid by at least 10% and or to reduce the FCMP of the hydrocarbon fluid by at least 10% is less than or equal to 1 wt. % of the hydrocarbon fluid.

Suitable examples of hydrocarbon base fluids include, but are not limited to, synthetic hydrocarbon fluids, petroleum based hydrocarbon fluids, natural hydrocarbon (non-aqueous) fluids or other similar hydrocarbons or mixtures or combinations thereof. Exemplary hydrocarbon fluids include, but are not limited to, poly-[alpha]-olefins, polybutenes, polyolesters, biodiesels, simple low molecular weight fatty esters of vegetable or vegetable oil fractions, simple esters of alcohols such as Exxate® from Exxon Chemicals, vegetable oils, animal oils or esters, other essential oil, diesel, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (IO) having between about 12 and 20 carbon atoms, linear alpha olefins having between about 14 and 20 carbon atoms, poly-[alpha]-olefins having between about 12 and about 20 carbon atoms, isomerized [alpha]-olefins (IAO) having between about 12 and about 20 carbon atoms, VM&P Naptha (Varnish Makers and Painter naptha), Linpar, Paraffins having between 13 and about 16 carbon atoms, HF® 1000 (produced by Sasol, USA), and mixtures or combinations thereof.

In some embodiments, [MOIM]Cl is added to the hydrocarbon fluid in an amount of 1 wt. % of the hydrocarbon fluid, and FCMP of the hydrocarbon fluid is reduced by at least 15%, preferably 17.5%, preferably 20%, preferably 25%, preferably 29%, preferably 29.1%, preferably 29.2%, preferably 29.3%, preferably 29.4%, preferably 29.5%, preferably 29.6%, preferably 29.7%, preferably 29.8%, preferably 29.9% preferably 30%, preferably 30.1%. In a preferred embodiment, [MOIM]Cl is added to the hydrocarbon fluid in an amount of 1 wt. % of the hydrocarbon fluid, and FCMP of the hydrocarbon fluid is reduced by 30.14%.

In some embodiments, [MOIM]Cl is added to the hydrocarbon fluid in an amount of 0.1 wt. % of the hydrocarbon fluid, and MMP of the hydrocarbon fluid is reduced by at least 5%, preferably 10%, preferably 13.1%, preferably 13.2%, preferably 13.3%, preferably 13.4%, preferably 13.5%, preferably 13.6%, preferably 13.7%, preferably 13.8%, preferably 13.9%, preferably 14%, preferably 14.25%, preferably 14.5%, preferably 14.75%. In a preferred embodiment, [MOIM]Cl is added to the hydrocarbon fluid in an amount of 0.1 wt. % of the hydrocarbon fluid, and MMP of the hydrocarbon fluid is reduced by 14.84%.

In some embodiments, [MOIM]Cl is added to the hydrocarbon fluid in an amount of 0.1 wt. % of the hydrocarbon fluid, and FCMP of the hydrocarbon fluid is reduced by at least 5%, preferably 10%, preferably 13.1%, preferably 13.2%, preferably 13.3%, preferably 13.4%, preferably 13.5%, preferably 13.6%, preferably 13.7%, preferably 13.8%, preferably 13.9%, preferably 14%, preferably 14.25%. In a preferred embodiment, [MOIM]Cl is added to the hydrocarbon fluid in an amount of 0.1 wt. % of the hydrocarbon fluid, and FCMP of the hydrocarbon fluid is reduced by 14.34%.

In some embodiments, [DMIM]Cl is added to the hydrocarbon fluid in an amount of 1 wt. % of the hydrocarbon fluid, and MMP of the hydrocarbon fluid is reduced by at least 5%, preferably 10%, preferably 12.1%, preferably 12.2%, preferably 12.3%, preferably 12.4%, preferably 12.5%, preferably 12.6%, preferably 12.7%, preferably 12.8%, preferably 12.9%, preferably 13%, preferably 13.25%. In a preferred embodiment, [DMIM]Cl is added to the hydrocarbon fluid in an amount of 1 wt. % of the hydrocarbon fluid, and MMP of the hydrocarbon fluid is reduced by 13.47%.

In some embodiments, [DMIM]Cl is added to the hydrocarbon fluid in an amount of 1 wt. % of the hydrocarbon fluid, and FCMP of the hydrocarbon fluid is reduced by at least 15%, preferably 20%, preferably 30%, preferably 31%, preferably 31.5%, preferably 31.6%, preferably 31.7%, preferably 31.8%, preferably 31.9%, preferably 32%, preferably 32.1%, preferably 32.2%, preferably 32.3%, preferably 32.4%, preferably 32.5%. In a preferred embodiment, [DMIM]Cl is added to the hydrocarbon fluid in an amount of 1 wt. % of the hydrocarbon fluid, and FCMP of the hydrocarbon fluid is reduced by 32.61%.

In some embodiments, [DMIM]Cl is added to the hydrocarbon fluid in an amount of 0.1 wt. % of the hydrocarbon fluid, and MMP of the hydrocarbon fluid is reduced by at least 5%, preferably 10%, preferably 11.1%, preferably 11.2%, preferably 11.3%, preferably 11.4%, preferably 11.5%, preferably 11.6%, preferably 11.7%, preferably 11.8%, preferably 11.9%, preferably 12%, preferably 12.1%. In a preferred embodiment, [DMIM]Cl is added to the hydrocarbon fluid in an amount of 0.1 wt. % of the hydrocarbon fluid, and MMP of the hydrocarbon fluid is reduced by 12.16%.

In some embodiments, [DMIM]Cl is added to the hydrocarbon fluid in an amount of 0.1 wt. % of the hydrocarbon fluid, and FCMP of the hydrocarbon fluid is reduced by at least 10%, preferably 15%, preferably 20%, preferably 20.1%, preferably 20.2%, preferably 20.3%, preferably 20.4%, preferably 20.5%, preferably 20.6%, preferably 20.7%, preferably 20.8%, preferably 20.9%, preferably 21%, preferably 21.1%, preferably 21.2%, preferably 21.3%, preferably 21.4%, preferably 21.5%, preferably 21.6%, preferably 21.7%, preferably 21.8%, preferably 21.9%, preferably 22%. In a preferred embodiment, [DMIM]Cl is added to the hydrocarbon fluid in an amount of 0.1 wt. % of the hydrocarbon fluid, and FCMP of the hydrocarbon fluid is reduced by 21.92%.

In some embodiments, the crude oil has a density in a range from 0.25-2 gram per cubic centimeter (g/cm$^3$), preferably 0.4-1.6 g/cm$^3$, preferably 0.5-1.5 g/cm$^3$, preferably 0.6-1.4 g/cm$^3$, and preferably 0.7-1.3 g/cm$^3$.

In some embodiments, the crude oil has a TAN less than or equal to 6 mgKOH/g, preferably 5 mgKOH/g, preferably 4 mgKOH/g, preferably 3.5 mgKOH/g, preferably 3 mgKOH/g, preferably 2.5 mgKOH/g, preferably 2 mgKOH/g, preferably 1.5 mgKOH/g, preferably 1 mgKOH/g.

In some embodiments, the crude oil has a viscosity of less than or equal to 200,000 cP, preferably 100,000 cP, preferably 90,000 cP, preferably 80,000 cP, preferably 70,000 cP, preferably 60,000 cP, preferably 50,000 cP.

The method further includes determining an operating temperature of the hydrocarbon fluid and characterizing the crude oil based on a density and an asphaltene content of the crude oil at the operating temperature to obtain an oil category. At this temperature, the density crude oil and asphaltene content are characterized, as these factors influence the stability, and viscosity of the oil and its potential for clogging or deposition. The method further includes adding the amount of the IL, an oil amount of the crude oil, and a water amount. The amount is determined based on the operating temperature and the oil category.

EXAMPLES

The following examples demonstrate a method of reducing a minimum miscibility pressure (MMP) of a hydrocarbon fluid using an ionic liquid in a subterranean geologic formation. The examples are provided solely for illustration and are not to be construed as limitations of the present disclosure, as many variations are possible without departing from the spirit and scope of the present disclosure.

Example 1: Materials

The aspects of the present disclosure provide a $CO_2$-oil system, which requires the use of high-purity $CO_2$. Hence, $CO_2$ with a purity level of 99.9% was sourced from *Air Liquide Al Khafrain industrial gases (ALKIG)*.

Example 2: Crude Oils

Five crude oils were evaluated in the present disclosure with a wide range of variations in properties and composition of the crude oils. The densities of the crude oils tested ranged from 0.862 grams per cubic centimeter ($g/cm^3$) to 1.15 $g/cm^3$ at ambient conditions, while asphaltene content varied between 6.41 weight percent (wt. %) and 35.96 wt. %. In addition, the total acid number (TAN) for each crude was analyzed and depicted in FIG. 1 along with aforementioned properties. As can be seen from FIG. 1, a diverse range of crude oil characteristics was considered for sensitivity analysis and obtain screening for crude oils.

Example 3: Chemicals Utilized to Reduce MMP in $CO_2$-Oil System

Three chemicals were utilized to reduce minimum miscibility pressure (MMP) in $CO_2$-oil system including fatty acids, alcohols, and non-ionic surfactant (NIS). Alcohols and NIS demonstrate enhanced performance in reducing the MMP compared to fatty acids, which exhibit a minimal effect on the MMP reduction in the $CO_2$-oil system. The effect of certain above listed chemicals is identified in the literature as efficient in MMP reduction, including alcohols, NIS, and ionic liquids (ILs).

Example 4: Non-Ionic Surfactant

A non-ionic surfactant (NIS) was used to reduce MMP in $CO_2$-oil system. Moreover, the effect of the addition of NIS on the crude dynamic viscosity were investigated at different concentrations and temperatures. NIS was supplied by *Sunita Hydrocolloids Inc (SHI)*. NIS is a micro-emulsion that is composed of a non-ionic surfactant, limon oil, and water. The percentage of each element is shown in Table 1. Further, n-butanol (BL) was also supplied by SHI with a purity of 99%. The molecular structure of BL is shown in FIG. 2.

TABLE 1

| Composition of the used micro-emulsion | |
|---|---|
| Element | Wt. % |
| Non-ionic surfactant | 1-5 |
| Limon oil | 5-20 |
| Water | 30-50 |

Example 5: Ionic Liquids (ILs)

Green chemicals offer advantages over other chemicals. ILs are non-toxic, biodegradable, energy efficient in production, reduce waste, safer synthesis and processing, and improve life cycle chemicals. Two types of ILs were used in the present disclosure including 1-methyl-3-octylimidazolium chloride ([MOIM]Cl) and 1-decyl-3-methylimidazolium chloride ([DMIM]Cl), as shown in FIGS. 3A-3B. The ILs were obtained from Sigma-Aldrich. The used chemicals had a purity of 97%, determined by high performance liquid chromatography (HPLC). Different concentrations were utilized on the different crudes and their effect on MMP value in $CO_2$-oil systems were examined.

Example 6: Experimental Procedures

The present disclosure includes characterization of the crude oils, and one crude oil out of the five crude oils was selected for initiation of chemical screening processes to evaluate ability of the crude oil to reduce the MMP in a $CO_2$-oil system. In order to begin the screening, one of the crudes, as shown in FIG. 1, was selected to investigate the effects of various chemicals at different concentrations. Crude 3 represents the median crude when compared to other crudes in terms of density, viscosity, TAN, and asphaltene content. Due to these reasons, crude 3 was taken as a base case to perform the screening on crude 3.

After selecting crude 3 as the base case, the MMP and first contact miscibility pressure (FCMP) for the $CO_2$-crude 3 system were estimated using the vanishing interfacial tension (VIT) method. Further, chemical screening was carried out using crude 3 to select optimum chemical and concentration of the chemical. After selecting the optimal chemical, an effect of the chemical on the other four crudes was examined at temperatures ranging from 50° C. and 90° C. Moreover, different concentrations were introduced to some of the crudes to examine the effect of chemical concentration.

Example 7: Crude Oil Characterization

The densities of the crudes were determined, at both atmospheric pressure and elevated temperatures, by a densitometer to measure the density of the liquids under ambient and high-temperature conditions. The instrument used for density measurement was the Anton Paar DMA 4500M, which operates based on oscillation features. The system incorporates automatic bubble detection technology and viscosity correction across all viscosity ranges. In order to determine the density of a liquid, the instrument was first calibrated to air density using an air pump integrated into the device. Subsequently, the liquid was injected through a syringe into a chamber of the instrument, with visual confirmation provided via an on-screen display to provide an absence of bubbles for accurate density determination. The desired temperature was set, and the instrument started measuring the density under the specified conditions.

Dynamic viscosity of the five crude oil samples was determined by the utilization of modular compact rheometer (MCR 702) at atmospheric pressure and different temperatures. The MCR 702 instrument measures the dynamic viscosity at different shear stress values. To operate the instrument, about 20 milliliter (mL) of the sample was inserted into a cup, the temperature was set to the desired value, a cone was lowered into the sample and a torque was applied on the sample. Furthermore, a shear stress along with the shear strain were recorded and plotted on a graph, where the value of the viscosity may be inferred from the slope of the straight line present on the graph.

A saturates, aromatics, resins, and asphaltenes (SARA) analysis was further conducted which offered an overview of the chemical composition of the sample, without molecular specifics. The SARA analysis divided the analyzed mixtures into four components: saturates, aromatics, resins, and asphaltenes. The process includes employing thin layer chromatography (TLC) and flame ionization detection (FID) with Iatrosmay MK-7, following a standard method IP 469/01. The SARA analysis included three stages, applying a microliter of the diluted sample in dichloromethane onto a chromo-rod (a quartz rod coated with silica). A second stage involved extracting the applied samples using TLC, and a third stage included identifying various groups present along the chromo-rods. The measurements were conducted under standard atmospheric pressure and temperature conditions for the five dead samples of crude oil. The potentiometric titration method using a Metrohm Ti-touch 916 titrator was employed to measure the TAN in accordance with ASTM D664-18. In order to determine the TAN, a 10 g sample of crude oil was dissolved in 60 mL of a titration solvent including 50% toluene ($C_7H_8$), 49.5% isopropanol ($C_3H_8O$), and 0.5% water ($H_2O$). A dosing rate of 0.1 ml of the titrant, which was a solution of 0.1 molar (M) KOH in 2-propanol, was used. Prior to any titration, the pH electrode was conditioned until a consistent pH value was achieved. The observations were conducted under normal atmospheric pressure and temperature conditions for the oil samples.

Example 8: Vanishing Interfacial-Tension Technique (VIT)

VIT has several applications in the petroleum industry, particularly in the evaluation of IFT between immiscible fluids, which was a parameter that affects the efficiency of various oil recovery techniques. VIT was also used in the evaluation of the wettability of reservoir rocks. Wettability was a parameter that affects the efficiency of enhanced oil recovery (EOR) processes [Rao, D., A new technique of vanishing interfacial tension for miscibility determination, *Fluid Phase Equilibria*, Volume 139, Issues 1-2, 1997, pages 311-324]. The VIT examination technique was utilized in the present disclosure, as shown in FIG. 4. A transparent cell that was initially charged with $CO_2$ and oil droplets was used, usually with slightly under 10% volume of oil. Oil droplets were introduced into the cell by a capillary tube at the top of the cell. $CO_2$ was injected into the cell to keep the pressure at a set value. The initial volume of $CO_2$ and oil in the cell was allowed to equilibrate for approximately an hour. The Young-Laplace equation was used to estimate the IFT based on the physical shape of the droplet after photographing its shape [Jessen, K., et al., On interfacial-tension measurements to estimate minimum miscibility pressures, *SPE Res Eval & Eng*, 11, 05, 933-939, 2008]. IFT between the immiscible fluids (oil and $CO_2$) at temperatures ranging from 50° C. to 90° C., with different pressures was measured by a drop shape analyzer manufactured by KRÜSS (DSA 100 HP).

Figure 5:
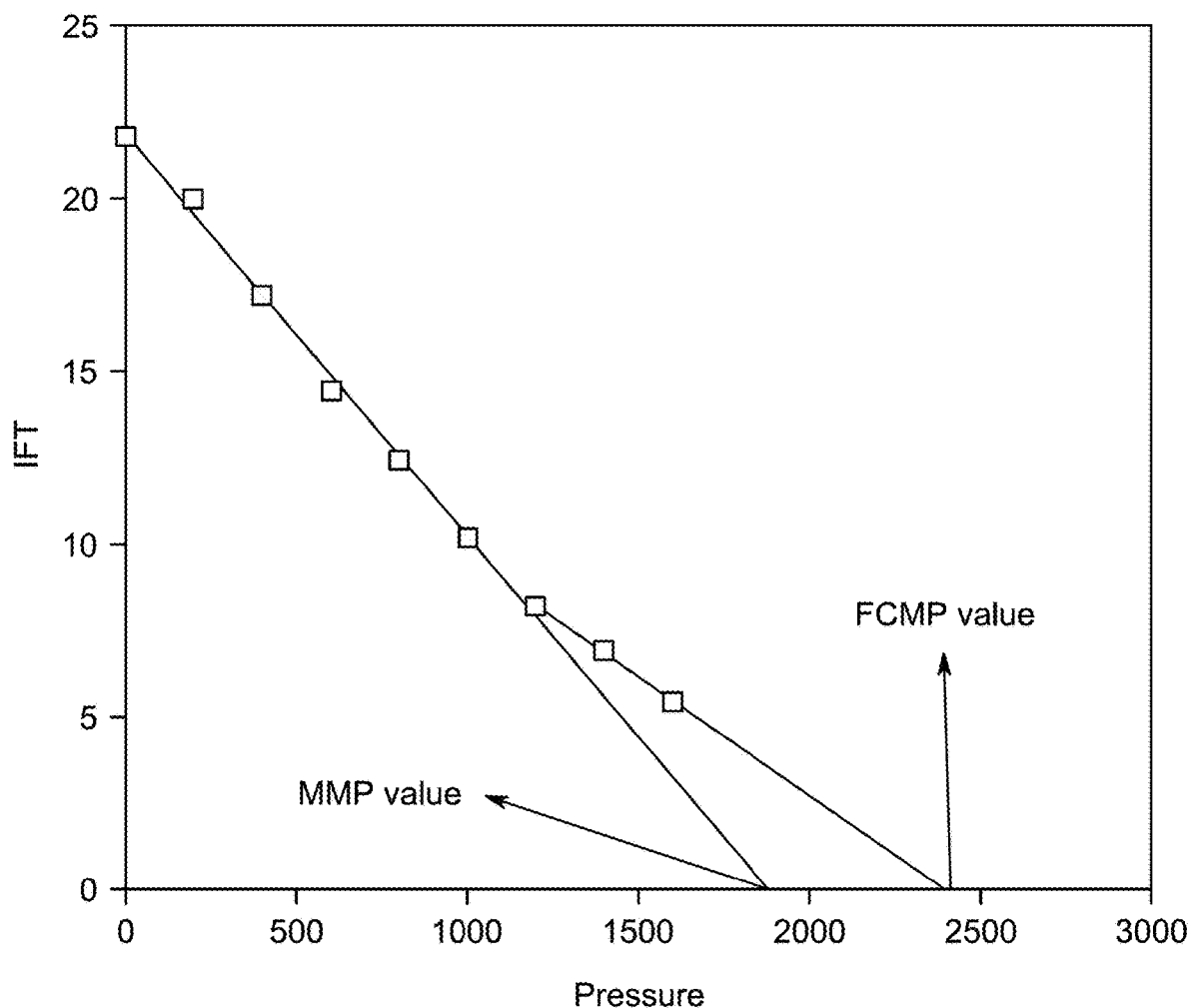
FIG. 5 depicts minimum miscibility pressure (MMP) and first contact miscibility pressure (FCMP) values from a plot of pressure versus interfacial tension (IFT), according to certain embodiments.

The IFT measurement procedure was repeated frequently at higher pressures until the droplet vanished. A plot of IFT vs pressure was created, as depicted in FIG. 5, with the points fitted with the appropriate linear function. The curve was further extrapolated to a pressure that provides zero IFT, and the pressure was deemed as the MMP value, while another set of linear points was extrapolated to the pressure that provides zero IFT, and this value was deemed as the FCMP. The two ranges occur due to the multi-contact miscibility process that controls the miscibility between the $CO_2$ and crude oil. Where mass transfer of light and intermediate components from oil to $CO_2$ becomes richer with hydrocarbon components until a certain pressure, at which asphaltene precipitation starts and a new range was identified.

The density of the five crudes was measured at atmospheric pressure across a wide range of temperatures, including those at which VIT was conducted. The temperatures ranged from 20° C. to 90° C., and the densities of the five crudes are listed in Table 2. The viscosity of the three heavy crudes was measured and the values are listed in Table 3. Determining the components of the five crudes through SARA analysis, along with the total acid number (TAN), helped determine the behavior of the five crudes upon the addition of different chemicals at varying concentrations. The results of the SARA analysis for the five crudes along with TAN are listed in Table 4.

TABLE 2

Densities of the five crudes at different temperatures and atmospheric pressure.

| Temperature, ° C. | Crude 1, g/cm$^3$ | Crude 2, g/cm$^3$ | Crude 3, g/cm$^3$ | Crude 4, g/cm$^3$ | Crude 5, g/cm$^3$ |
|---|---|---|---|---|---|
| 25 | 0.864 | 0.871 | 0.9045 | 1.067 | 1.150 |
| 50 | 0.845 | 0.836 | 0.888 | 1.055 | 1.138 |
| 90 | 0.817 | 0.823 | 0.859 | 1.032 | 1.117 |

TABLE 3

Dynamic viscosities of the heavier crudes used in the present disclosure.

| Temperature, ° C. | μ of crude 3, cP | μ of crude 4, cP | μ of crude 5, cP |
|---|---|---|---|
| 25 | 80 | 9,900 | 47,700 |
| 50 | 23.5 | 1,130 | 9,260 |
| 90 | 6 | 117 | 123 |

TABLE 4

SARA analysis of the five crudes utilized in the present disclosure.

| | Saturate, % | Aromatic, % | Resin, % | Asphaltene, % | TAN, mgKOH/g |
|---|---|---|---|---|---|
| Crude 1 | 22.86 | 64.56 | 6.17 | 6.41 | 0.05 |
| Crude 2 | 18.17 | 50.69 | 20.98 | 10.17 | 0.22 |

TABLE 4-continued

SARA analysis of the five crudes utilized in the present disclosure.

| | Saturate, % | Aromatic, % | Resin, % | Asphaltene, % | TAN, mgKOH/g |
|---|---|---|---|---|---|
| Crude 3 | 18.69 | 50.66 | 12.6 | 18.05 | 0.58 |
| Crude 4 | 8.27 | 43.1 | 22.4 | 26.27 | 1.358 |
| Crude 5 | 3.79 | 45.1 | 15.1 | 35.96 | 3.2 |

Figure 6A:
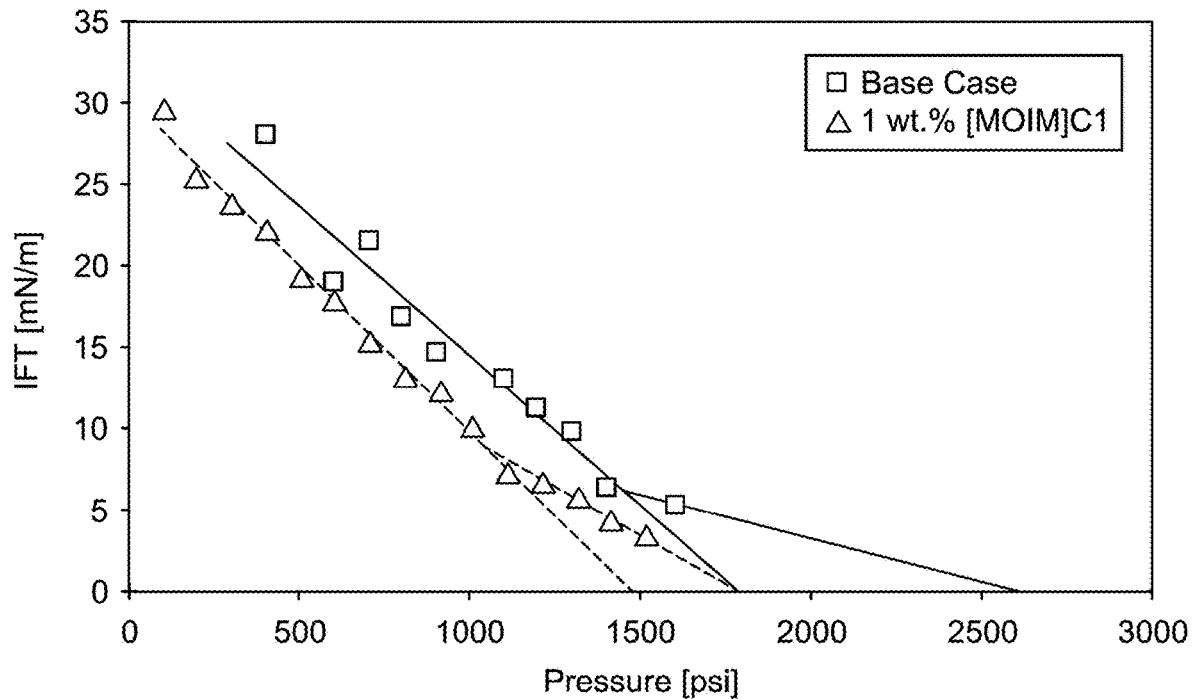
FIG. 6A shows MMP and FCMP values for 1 wt. % of [MOIM]Cl compared to a base case (crude 3), according to certain embodiments.
Figure 6B:
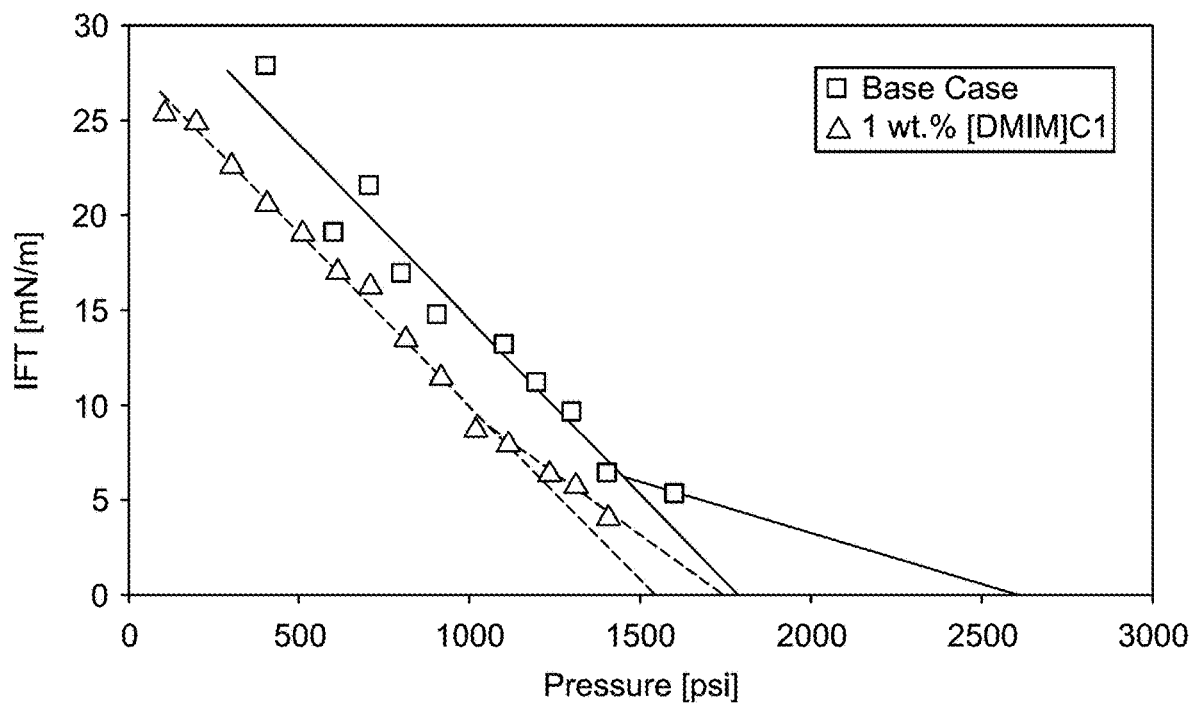
FIG. 6B shows MMP and FCMP for 1 wt. % of [DMIM]Cl compared to the base case (crude 3), according to certain embodiments.
Figure 7A:
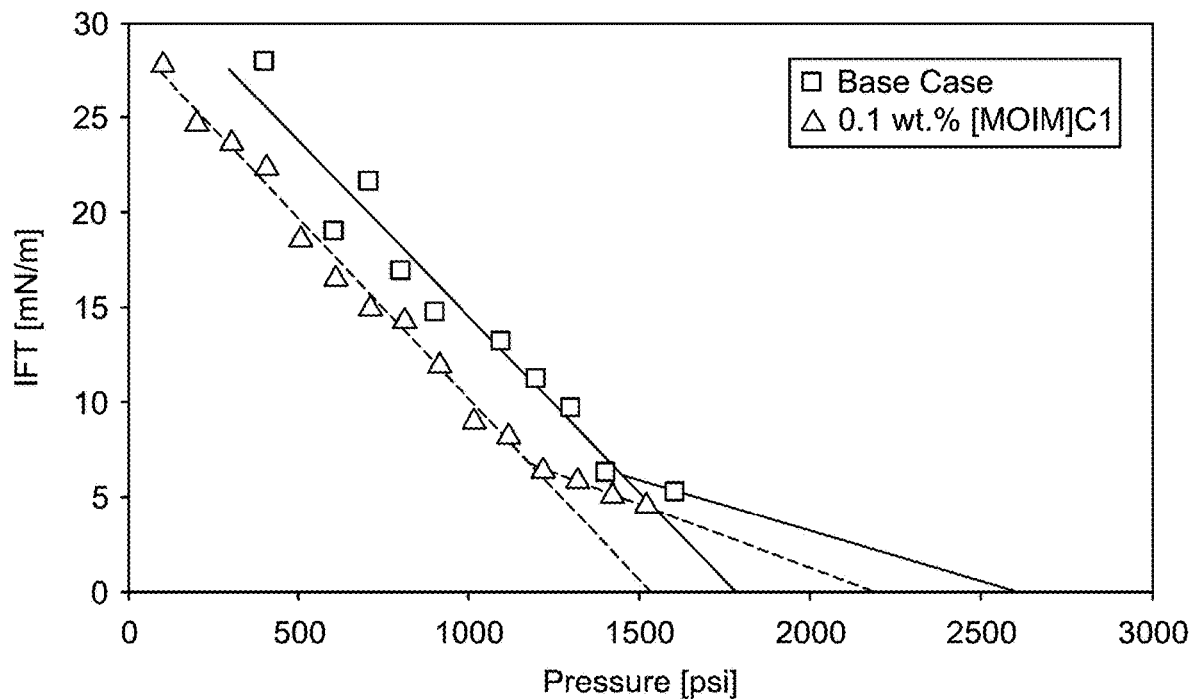
FIG. 7A shows MMP and FCMP for 0.1 wt. % of [MOIM]Cl compared to the base case (crude 3), according to certain embodiments.
Figure 7B:
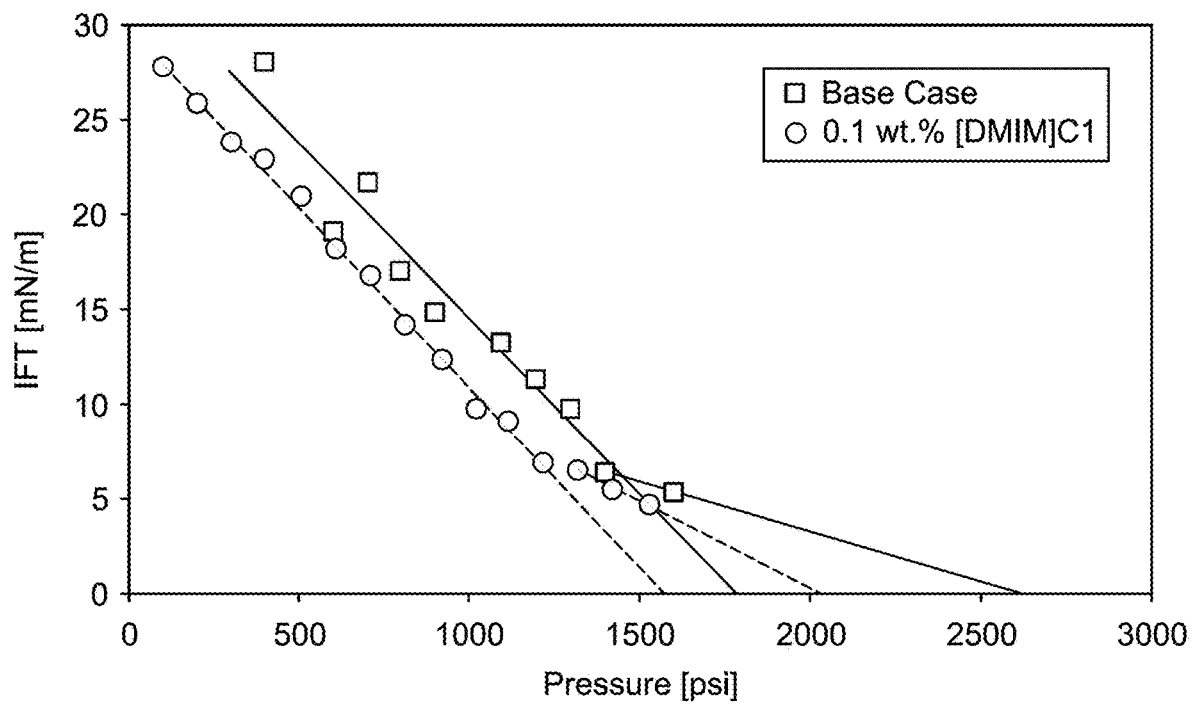
FIG. 7B shows MMP and FCMP for 0.1 wt. % of [DMIM]Cl compared to the base case (crude 3), according to certain embodiments.

The properties of the five crudes including asphaltene content, TAN, and density are depicted in FIG. 1. A diversity of the crudes was inferred from the properties and characteristics of the crudes. In order to initiate the screening process, one crude was selected to examine the effect of chemicals at different concentrations. A median crude was chosen based on the average values of asphaltene content, TAN, and crude oil density, whereby crude 3 was identified as the representative sample. Further, two ILs were used to improve $CO_2$ miscibility in crude oil, which were [MOIM] Cl, and [DMIM]Cl. The effect of these chemicals on MMP value were examined. Two concentrations of each chemical were considered including 0.1 wt. % and 1 wt. % of each chemical. The values of MMP and FCMP after the addition of the previously specified concentrations were compared with the values of $CO_2$-crude 3 oil system as a base case, without any additions. Furthermore, addition of 1 wt. % of [MOIM]Cl and [DMIM]Cl, as shown in FIGS. 6A-6B, achieved a notable impact on the reduction of MMP and FCMP. The MMP and FCMP values of 1 wt. % [MOIM]Cl were 1476.63 pounds per square inch (psi) and 1805.26 psi, respectively. The values may be presented as percentages of 17.27% and 30.14%, respectively. Moreover, the addition of 1 wt. % of [DMIM]Cl resulted in a lower reduction in terms of MMP values and higher reduction values in terms of FCMP. The values were 1544.48 psi and 1741.4 psi, respectively or 13.47% and 32.61%, respectively. Addition of 0.1 wt. % of [MOIM]Cl and [DMIM]Cl, as shown in FIG. 7A-7B, achieved yet another notable impact on the reduction of MMP and FCMP. The MMP and FCMP values of 0.1 wt. % [MOIM]Cl were 1528.95 psi and 2200.6 psi, respectively or 14.34% and 14.84%, respectively. Moreover, the addition of 0.1 wt. % of [DMIM]Cl resulted in a lower reduction in terms of MMP values and a higher reduction of FCMP. The values were 1567.74 psi and 2017.72 psi, respectively or 12.16% and 21.92%, respectively. A summary of the impact of the addition of [MOIM]Cl and [DMIM]Cl into $CO_2$-crude 3 oil system is listed in Table 5.

TABLE 5

MMP and FCMP for 0.1 wt. % and 1 wt. % of [MOIM]Cl and [DMIM]Cl, compared to the base case of crude 3.

| Crude type | MMP, psi | Reduction, % | FCMP, psi | Reduction, % |
|---|---|---|---|---|
| Crude 3 | 1784.5 | — | 2584.34 | — |
| 1% [MOIM]Cl | 1476.63 | 17.27 | 1805.26 | 30.14 |
| 1% [DMIM]Cl | 1544.48 | 13.47 | 1741.4 | 32.61 |
| 0.1% [MOIM]Cl | 1528.95 | 14.34 | 2200.6 | 14.84 |
| 0.1% [DMIM]Cl | 1567.74 | 12.16 | 2017.72 | 21.92 |

Figure 8:
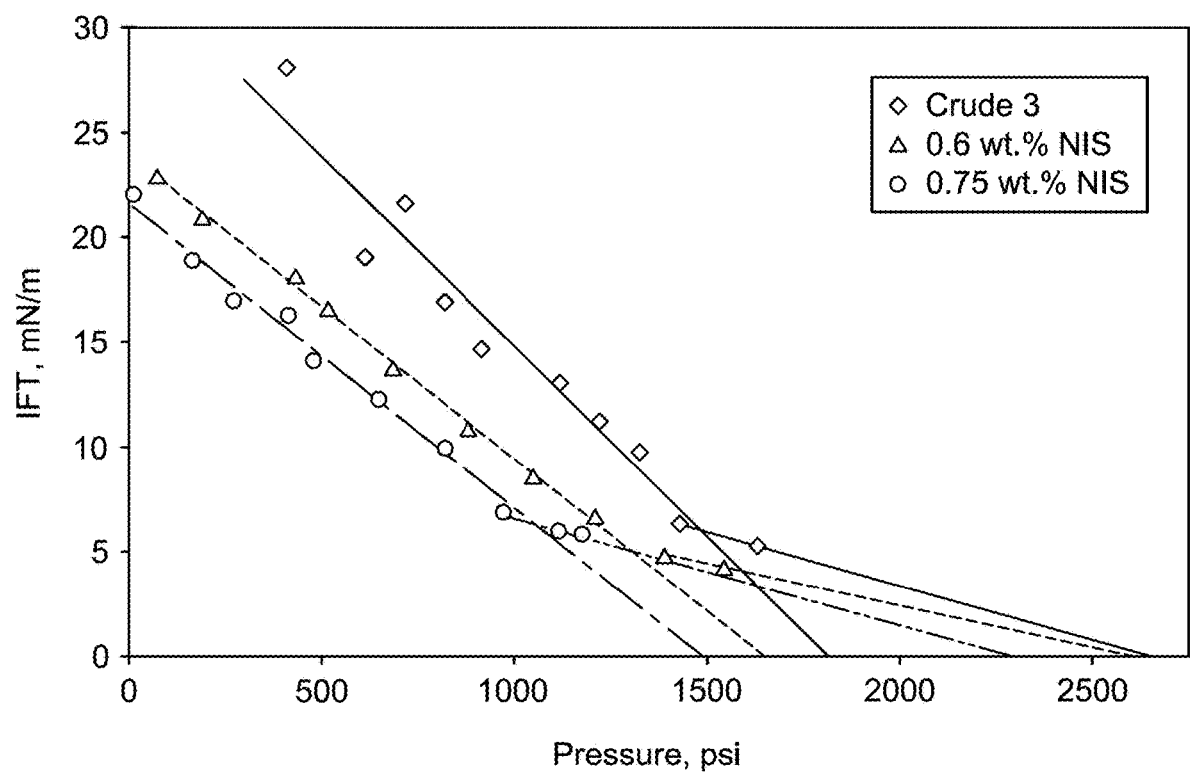
FIG. 8 shows MMP and FCMP values of crude 3 and NIS at 0.6 wt. % and 0.75 wt. %, at a temperature of about 50° C., according to certain embodiments.

In the present disclosure, initially, two concentrations of NIS were introduced at 0.6 wt. % and 0.75 wt. %. The MMP and FCMP values were determined for the $CO_2$-crude 3 system as a reference case. After the addition of 0.6 wt. % and 0.75 wt. % of NIS, MMP and FCMP were determined. Reduction in MMP and FCMP were recorded as percentages when compared to the base case. Measurements were conducted at 50° C., as shown in FIG. 8 and Table 6.

TABLE 6

MMP and FCMP values of crude 3, and 0.6 wt. %, 0.75 wt. % of NIS at 50° C.

| Crude type | MMP, psi | Reduction, % | FCMP, psi | Reduction, % |
|---|---|---|---|---|
| Crude 3 | 1785 | — | 2584.3 | — |
| Crude 3 + 0.6 NIS | 1617.5 | 9.38 | 2532.4 | 2 |
| Crude 3 + 0.75 NIS | 1460.8 | 18.16 | 2253.4 | 12.8 |

An evident reduction in the values of MMP and FCMP was observed, as reported in the previously mentioned table. This finding aligns with what has been documented in literature. However, when it comes to the effect of NIS, more NIS led to a viscosity increase of crude 3. The obtained results are not sufficient in preforming reduction in the viscosity of crude oil, due to the generation of a microemulsion. Therefore, the behavior of BL on crude 3 viscosity, MMP, and FCMP of $CO_2$-oil system was examined with different concentrations of BL.

Figure 9A:
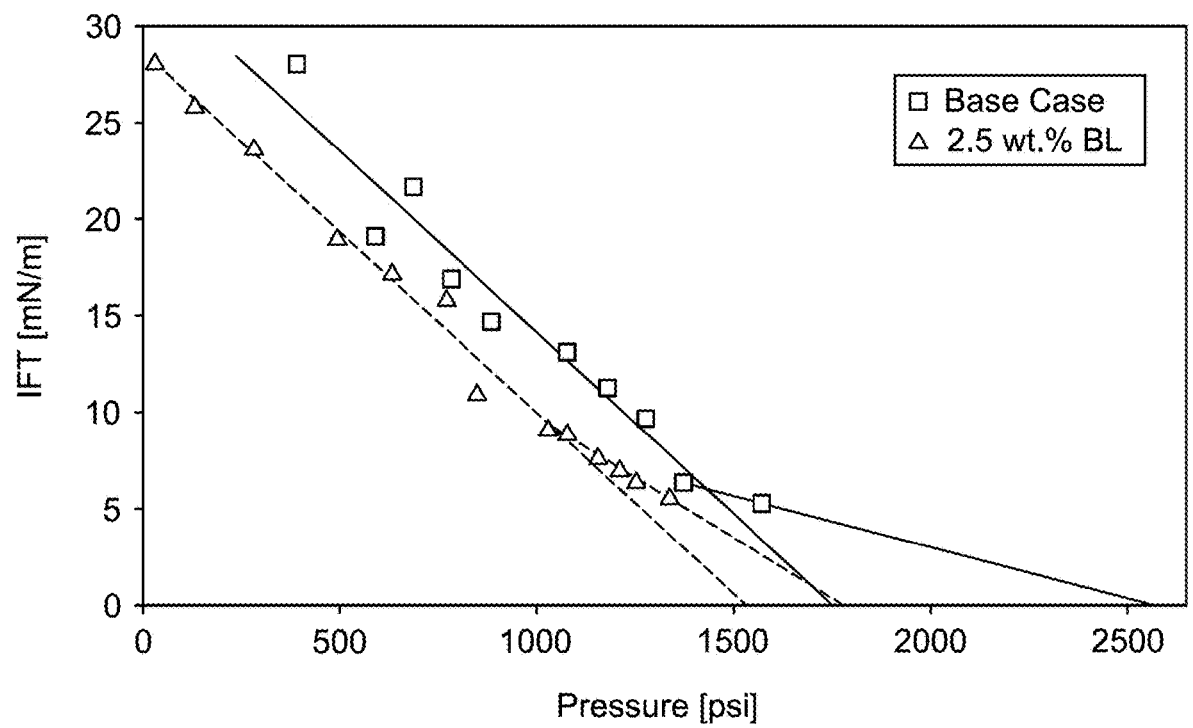
FIG. 9A shows MMP values for the base case and 2.5 wt. % BL, according to certain embodiments.

IFT values of the base case along with the two different concentrations of BL at pressures ranging from 400 psi up to 1300 psi were evaluated, individually. As shown in FIG. 9A, the IFT values for the $CO_2$-oil system were examined for base case and 2.5 wt. % BL. Reduction was observed in IFT values when compared with the base case. This reduction may be useful for estimating MMP and FCMP values. By extrapolation of the IFT to reach zero, MMP and FCMP values for the base case were determined of 1785 psi and 2584.3 psi, respectively. While MMP and FCMP for 2.5 wt. % BL were 1543.5 psi and 1824.3 psi, respectively. A reduction may be inferred, and this reduction may be described in percentage as 12.33% for MMP and 29.4% for FCMP.

Figure 9B:
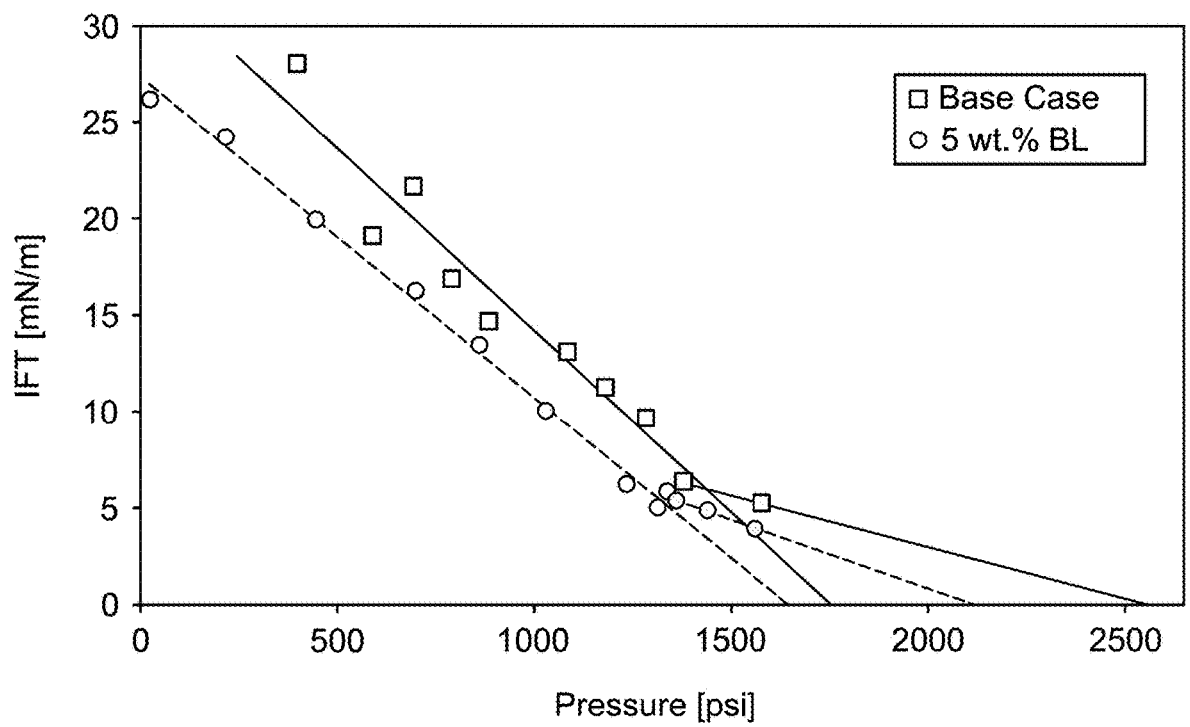
FIG. 9B shows FCMP values for the base case and 5 wt. % BL, according to certain embodiments.

FIG. 9B shows the IFT values for the $CO_2$-oil system for the base case and 5 wt. % BL. Reduction was observed in IFT values when compared with the base case. The aforementioned reduction provides for the estimation of MMP and FCMP values. By extrapolation of the IFT to reach zero, MMP and FCMP values for the base case were determined of 1785 psi and 2584.3 psi, respectively. While MMP and FCMP for 5 wt. % BL were 1672.5 psi and 2134.1 psi, respectively. Clear reduction may be inferred, and the reduction was about 6.3% in MMP and about 17.4% in FCMP. The outcomes of using BL of different concentrations along with the reductions in the values of MMP and FCMP are shown in Table 7.

TABLE 7

Values of MMP and FCMP of crude 3 and different concentrations of BL.

| Crude type | MMP, psi | Reduction, % | FCMP, psi | Reduction, % |
|---|---|---|---|---|
| Crude 3 | 1784.5 | — | 2584.34 | — |
| 2.5% BL | 1543.5 | 13.5 | 1824.3 | 29.4 |
| 5% BL | 1672.5 | 6.3 | 2134.1 | 17.42 |

Maximum reduction of MMP and FCMP was observed with the utilization of 2.5 wt. % of BL, recognized as a viscosity reducer. Further, lower reduction of MMP and FCMP were obtained by the utilization of 5 wt. % of BL.

Figure 10:
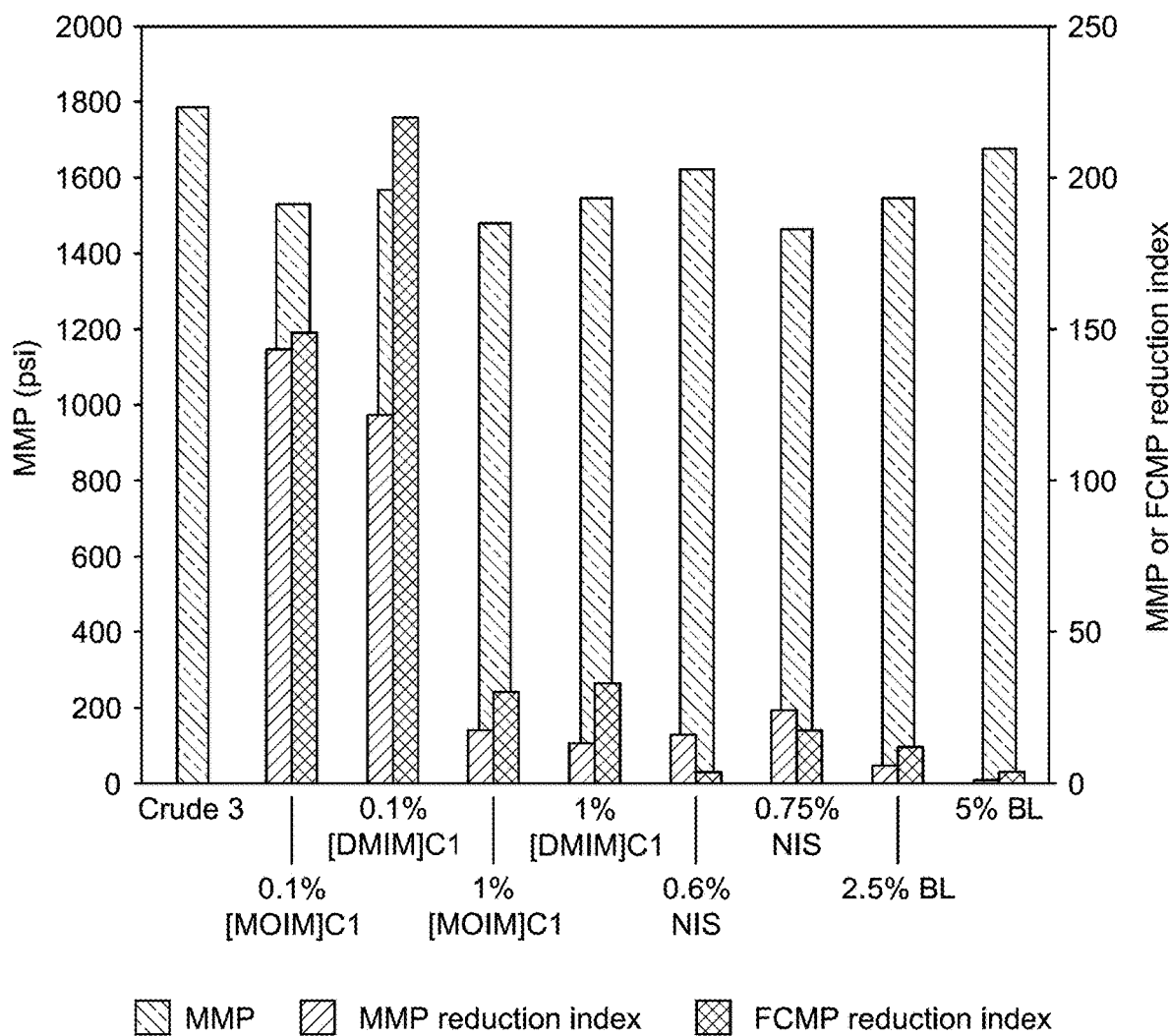
FIG. 10 depicts MMP reduction and the reduction index of MMP and FCMP values for crude 3, with different chemicals and concentrations, according to certain embodiments.

Screening of different types of chemicals for $CO_2$-crude oil 3 system at various concentrations showed that all of the used chemicals had an impact on the reduction of MMP and FCMP. In particular, the effect of NIS on $CO_2$-crude 3 system gave a useful reduction, and these results align with the ones obtained in the above mentioned examinations. However, NIS was mixed with a large amount of lemon oil and water in mixture to obtain a microemulsion (ME). Introducing the ME as shown in Table 1 obtained an increment in terms of crude 3 viscosity. Further, different chemicals were used with different concentrations, and the chemicals with subsequent effect on the reduction of MMP and FCMP are depicted in FIG. 10. In order to identify the optimum chemical to reduce MMP and FCMP, a new term was introduced which was reduction index for MMP and reduction index for FCMP. The reduction index was quantified by dividing the percentage of the reduction by the concentration of the chemical. According to the reduction index criterion, a higher reduction index value reflects more desirable chemical. Therefore, the optimum chemicals and concentrations were ILs with lower concentrations. When [MOIM]Cl and [DMIM]Cl were compared, it was observed that [MOIM]Cl developed a higher reduction in MMP values. The screening process concludes that ILs at lower concentrations were the most effective, and [MOIM]Cl was selected for further examination on other crudes.

Figure 11A:
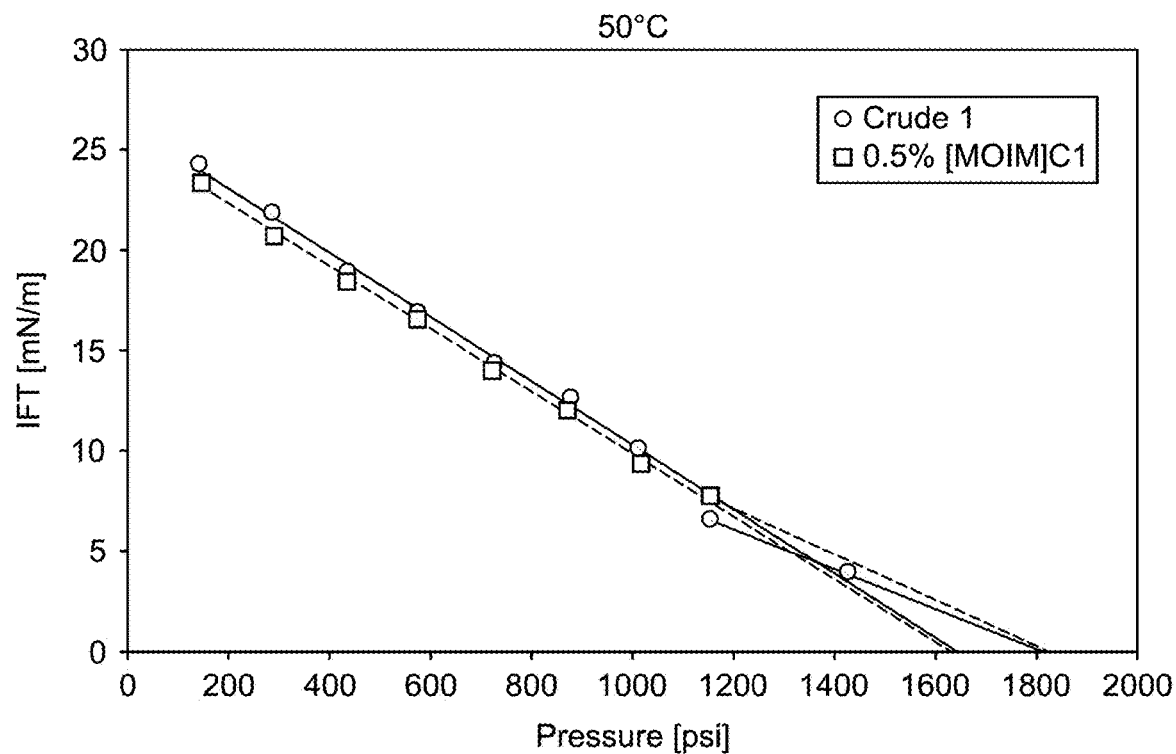
FIG. 11A shows MMP and FCMP for crude 1 and 0.5 wt. % of [MOIM]Cl at 50° C., according to certain embodiments.
Figure 11B:
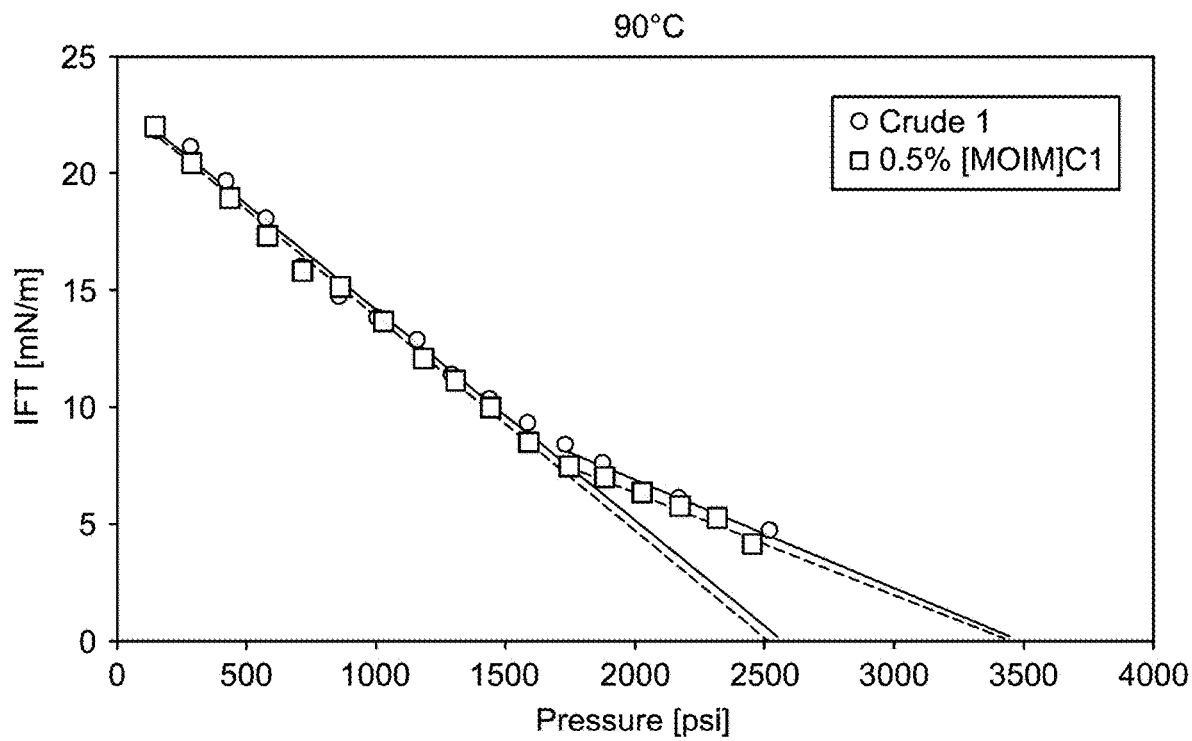
FIG. 11B shows MMP and FCMP for crude 1 and 0.5 wt. % of [MOIM]Cl at 90° C., according to certain embodiments.

The effectiveness of [MOIM]Cl suggested that [MOIM]Cl is an ideal additive since it achieved the maximum reduction in MMP at the lowest concentration compared to other chemicals. Therefore, an analysis was carried out to examine the effect of [MOIM]Cl on the remaining four crudes. The VIT were performed at different temperatures ranging from 50° C. to 90° C. In the screening, two concentrations were investigated, which were 0.1 wt. % and 1 wt. % of [MOIM]Cl. To further verify the conclusions, two concentrations were considered, which were 0.5 wt. % for all crudes and 1 wt. % for the ultra-heavy crude to examine the effect of concentration on MMP and FCMP in $CO_2$-oil system. Crude 1 was classified as a light crude oil due to its lower density and asphaltene content. As a consequence, 0.5 wt. % of [MOIM]Cl was added to the crude and the results of MMP and FCMP at 50° C. to 90° C. were estimated. Both the MMP and FCMP were estimated at the previously specified conditions. The values at 50° C. were 1643.1 psi and 1823.7 psi, respectively and the values at 90° C. were 2571.8 psi and 3513.9 psi, respectively. Furthermore, addition of 0.5 wt. % of [MOIM]Cl achieved a minor impact on the reduction of MMP and FCMP at temperatures of about 50° C. and 90° C., as depicted FIGS. 11A-11B. The values at 50° C. were 1630 psi and 1823.4 psi, respectively, or 0.8% and 0%, respectively. Moreover, the addition of 0.5 wt. % of [MOIM]Cl at 90° C. resulted in a higher reduction in terms of MMP and FCMP values. The values were 2523.8 psi and 3400 psi, respectively, or 1.9% and 3.2%, respectively. The reduction was minor, however, it may be recommended for implementation in petroleum industry. In addition, it may be inferred that [MOIM]Cl performs better at higher temperatures.

Figure 12A:
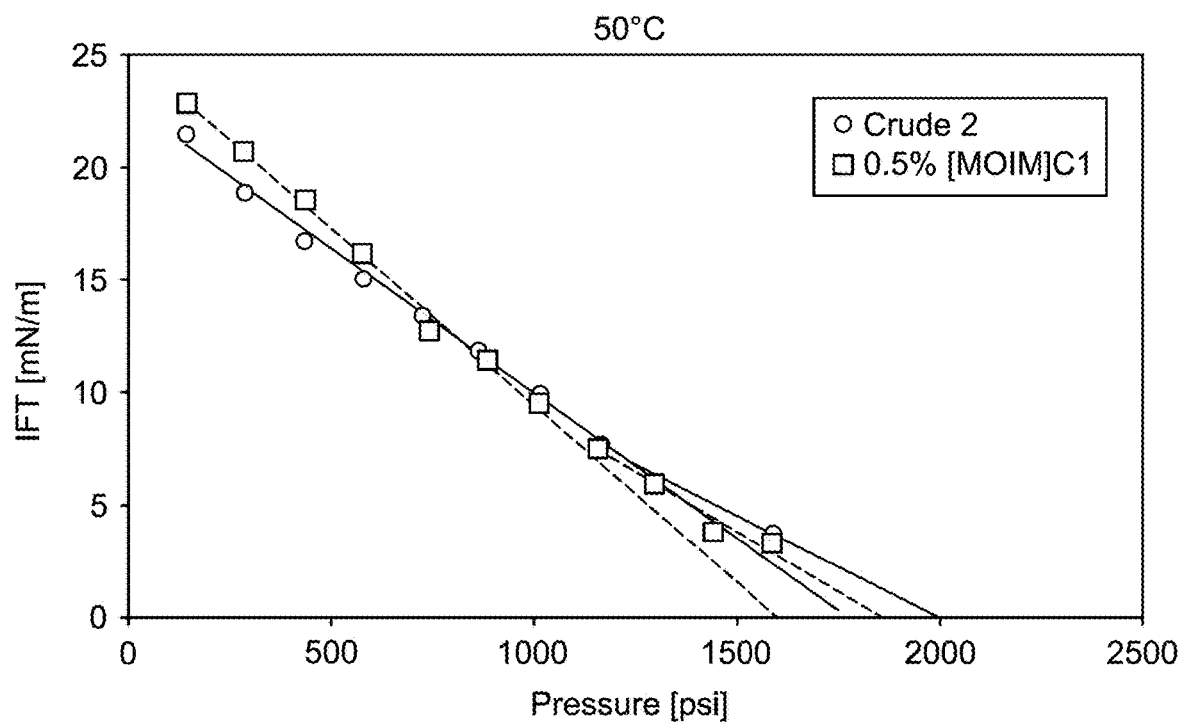
FIG. 12A shows MMP and FCMP for crude 2 and 0.5 wt. % of [MOIM]Cl at 50° C., according to certain embodiments.
Figure 12B:
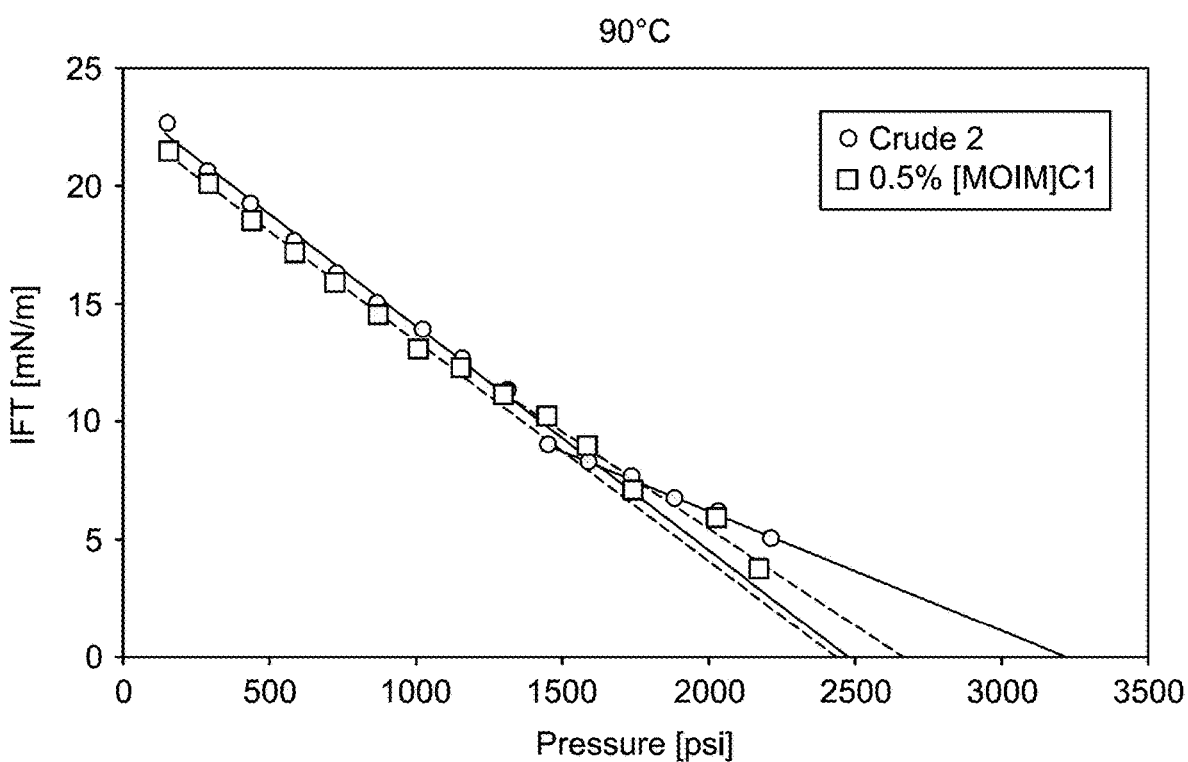
FIG. 12B shows MMP and FCMP for crude 2 and 0.5 wt. % of [MOIM]Cl at 90° C., according to certain embodiments.

Next, crude 2 was categorized as a medium crude oil, due to its density and moderate asphaltene content. Consequently, 0.5 wt. % of [MOIM]Cl was added to the crude and the results of MMP and FCMP at 50° C. and 90° C. were estimated, as shown in FIGS. 12A-12B. Both MMP and FCMP were estimated at the previously specified conditions. The values at 50° C. were 1762.8 psi and 2004.4 psi, respectively, and the values at 90° C. were 2477.5 psi and 2973.5 psi, respectively. Addition of 0.5 wt. % of [MOIM]Cl achieved a minor impact on the reduction of MMP and FCMP at temperatures of 50° C. and 90° C. The values at 50° C. were about 1609.4 psi and 1869.4 psi, respectively, or 8.7% and 6.7%, respectively. However, the addition of 0.5 wt. % of [MOIM]Cl at 90° C. resulted in a minor reduction in terms of MMP and a larger reduction in terms of FCMP values. The values were 2443.1 psi and 2674.9 psi, respectively, or 1.4% and 10.04%, respectively. The reduction was minor, however, it may be recommended for implementation in petroleum industry. However, it may be inferred that [MOIM]Cl performs better in lowering the FCMP at higher temperatures.

Figure 13A:
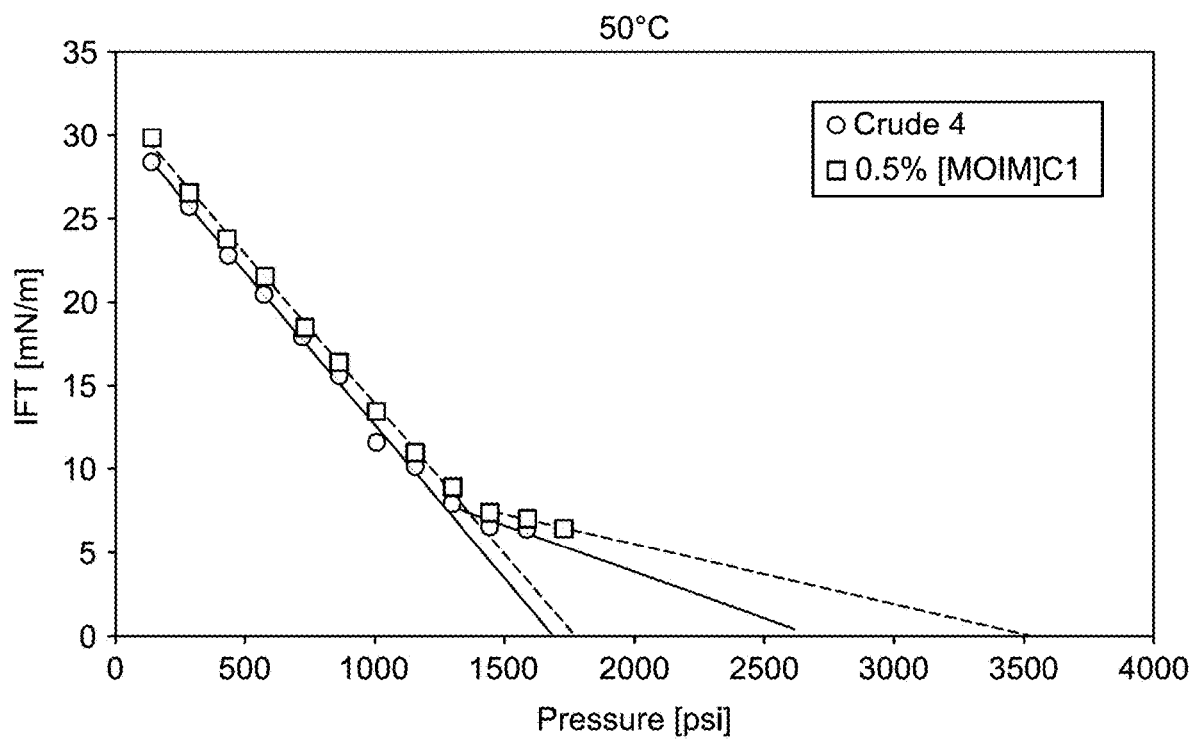
FIG. 13A shows MMP and FCMP for crude 4 and 0.5 wt. % of [MOIM]Cl at 50° C., according to certain embodiments.
Figure 13B:
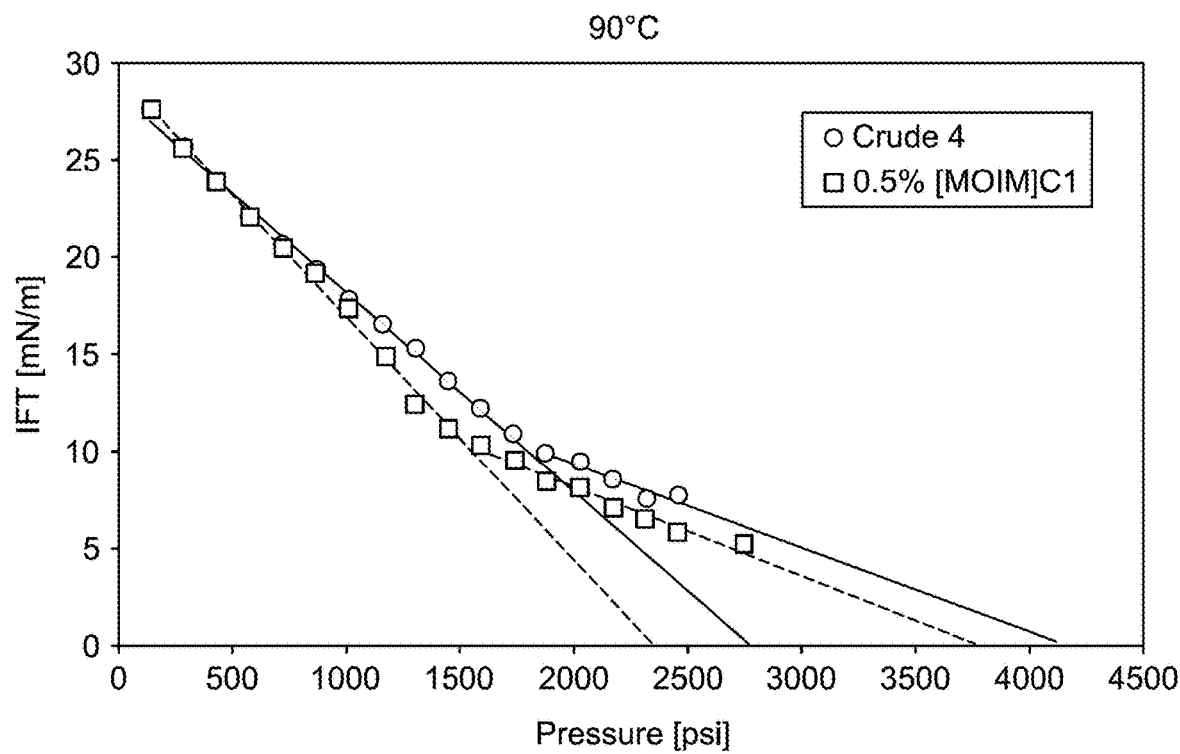
FIG. 13B shows MMP and FCMP for crude 4 and 0.5 wt. % of [MOIM]Cl at 90° C., according to certain embodiments.

Crude 4 was categorized as an extra-heavy crude oil, due to its high density and high asphaltene content. As a consequence, 0.5 wt. % of [MOIM]Cl was added to the crude and the results of MMP and FCMP at 50° C. and 90° C. were estimated. Initially, both MMP and FCMP were estimated at the previously specified conditions. The values at 50° C. were 1690 psi and 2705.8 psi, respectively, and the values at 90° C. were 2783.9 psi and 4183.9 psi, respectively. The addition of 0.5 wt. % of [MOIM]Cl achieved a negative impact on the reduction of MMP and FCMP at temperature of 50° C. However, this was not observed in the present disclosure at 90° C., as depicted in FIGS. 13A-13B. The values at 50° C. were 1749.7 psi and 2869.5 psi, respectively, or 3.53% and 6.05%, respectively. However, the addition of 0.5 wt. % of [MOIM]Cl at 90° C. resulted in a reduction in terms of MMP and reduction in terms of FCMP values. The values were 2351.7 psi and 37561.1 psi, respectively, or 15.5% and 10.2%, respectively. The above observed reduction was desirable and may be recommended to be implemented in the petroleum industry. Moreover, it may be inferred that [MOIM]Cl performs better for crudes with higher polarity content at higher temperatures. In other words, [MOIM]Cl performed better at reducing MMP and FCMP at higher asphaltene content and higher temperatures.

Figure 14A:
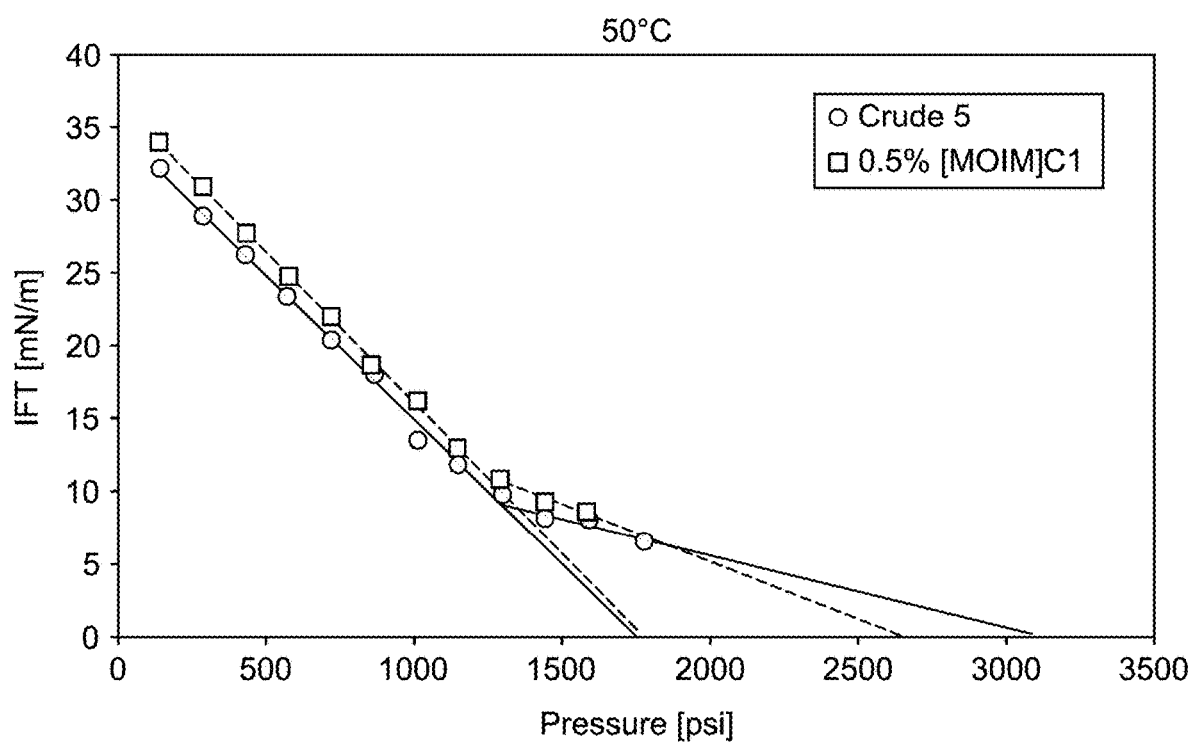
FIG. 14A shows MMP and FCMP for crude 5 and 0.5 wt. % of [MOIM]Cl at 50° C., according to certain embodiments.
Figure 14B:
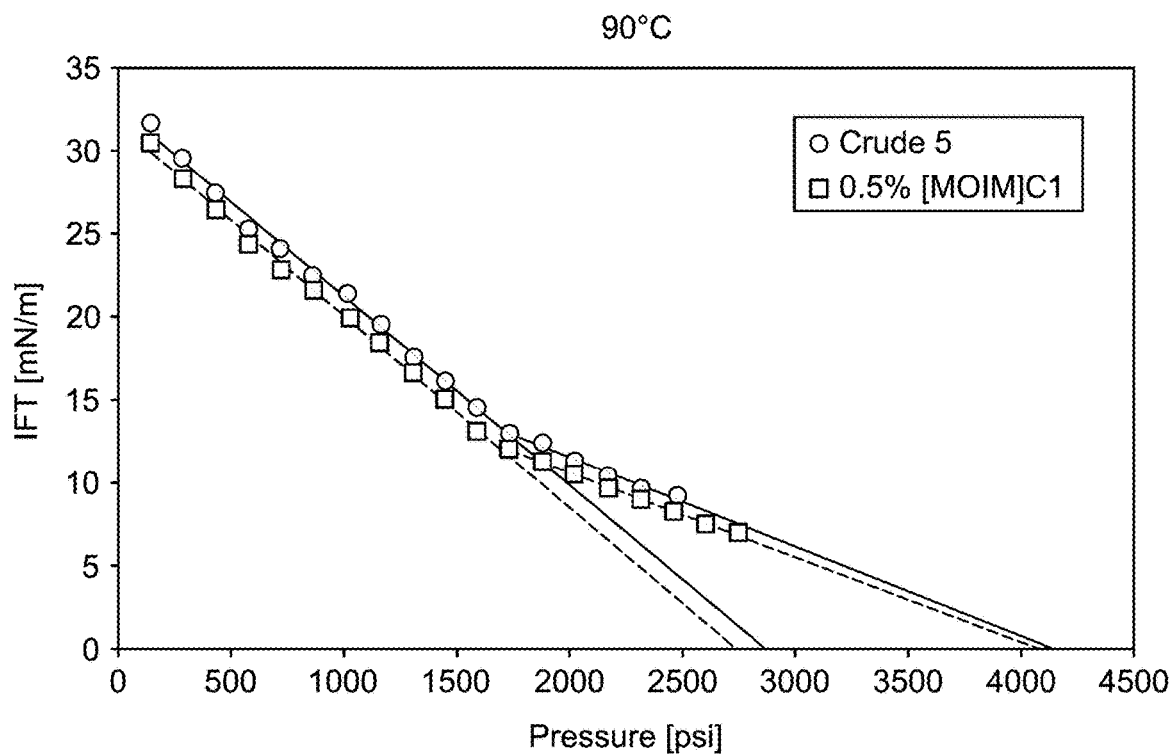
FIG. 14B shows MMP and FCMP for crude 5 and 0.5 wt. % of [MOIM]Cl at 90° C., according to certain embodiments.

Crude 5 was categorized as an ultra-heavy Crude oil, due to its very high density and very high asphaltene content. As a consequence, 0.5 wt. % of [MOIM]Cl was added to the crude and the results of MMP and FCMP at 50° C. and 90° C. were estimated. Initially, both MMP and FCMP were estimated at the previously specified conditions. The values at 50° C. were 1753.4 psi and 3098.4 psi, respectively and the values at 90° C. were 2856.1 psi and 4124.1 psi, respectively. Furthermore, the addition of 0.5 wt. % of [MOIM]Cl achieved a negative impact on the reduction of MMP and not the FCMP at temperature of 50° C., which is the same case at 90° C. as well, as shown in FIGS. 14A-14B. The values at 50° C. were 1775.4 psi and 2665.9 psi, respectively, or −1.25% and 13.96%, respectively. However, the addition of 0.5 wt. % of [MOIM]Cl at 90° C. resulted in a reduction in terms of MMP and poor reduction in terms of FCMP values. The values were as follows 2741.8 psi and 4078.4 psi, respectively or 4% and 1.125%, respectively. Moreover, it may be inferred that [MOIM]Cl performs better for crudes with higher polarity content at higher temperatures. In other words, at higher asphaltene content and high temperatures [MOIM]Cl performed well in reducing MMP and FCMP.

Figure 15A:
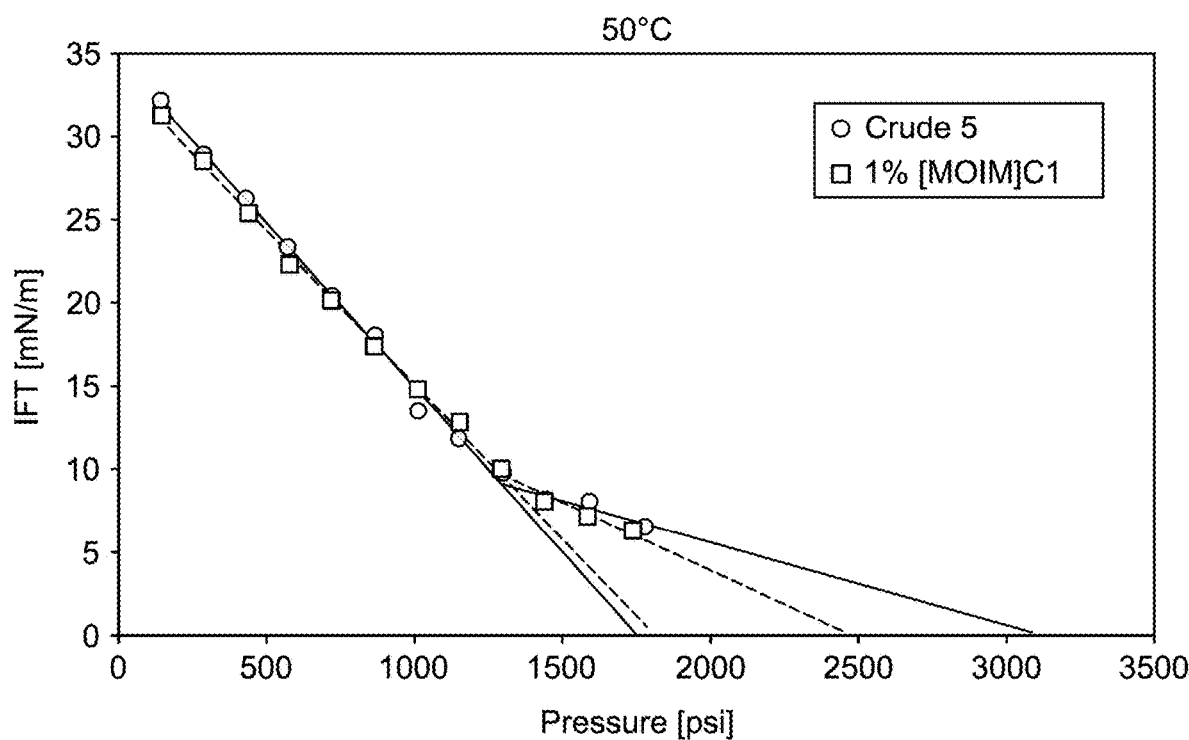
FIG. 15A shows MMP and FCMP for crude 5 and 1 wt. % of [MOIM]Cl at 50° C., according to certain embodiments.
Figure 15B:
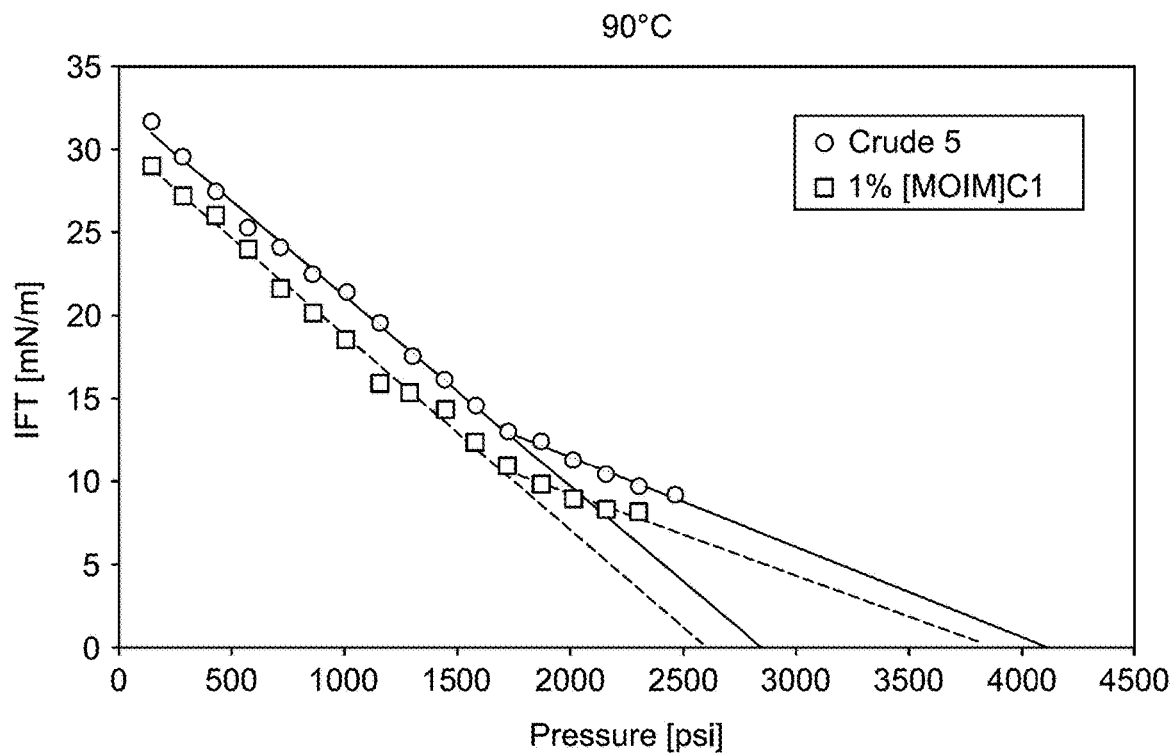
FIG. 15B shows MMP and FCMP for crude 5 and 1 wt. % of [MOIM]Cl at 90° C., according to certain embodiments.

Addition of 1 wt. % of [MOIM]Cl achieved a negative impact on the reduction of the MMP and not the FCMP at temperature of 50° C. Moreover, that is the same case at 90° C., as shown in FIGS. 15A-15B. The values at 50° C. were 1816.5 psi and 2488.7 psi, respectively or −3.6% and 19.67%, respectively. However, the addition of 1 wt. % of [MOIM]Cl at 90° C. resulted in a reduction of MMP and FCMP values. The values were 2672.5 psi and 3902.4 psi, respectively, or 6.4% and 5.4%, respectively. Moreover, it may be inferred that [MOIM]Cl performs better for crudes with higher polarity content at higher temperatures.

The embodiments, methods, and compositions described herein provide a method for enhancing $CO_2$ miscibility in crude oil, particularly in deep heavy oil reservoirs where traditional thermal EOR techniques face substantial limitations. By leveraging the physicochemical properties of ionic liquids, specifically 1-methyl-3-octylimidazolium chloride ([MOIM]Cl) and 1-decyl-3-methylimidazolium chloride ([DMIM]Cl), the method as disclosed herein reduces minimum miscibility pressure (MMP) and first contact miscibility pressure (FCMP), providing efficient $CO_2$ solubility and oil recovery. The disclosed method utilizes chemical agents that maintain asphaltene suspension in solution and prevent phase separation in heavy crude oil systems. The present disclosure provides a sustainable, environmentally compatible, and scalable solution for $CO_2$-EOR applications, that may enhance recovery while mitigating formation damage and operational challenges. It is to be understood that the foregoing embodiments are illustrative of the principles of the disclosure and that various modifications, substitutions, and adaptations may be made without departing from the spirit and scope of the disclosure.

Numerous modifications and variations of the present disclosure are possible in light of the above teachings. Therefore, it is to be understood that within the scope of the appended claims, the disclosure may be practiced other than as specifically described herein.

The invention claimed is:

1. A method of reducing a minimum miscibility pressure (MMP) of a hydrocarbon fluid and carbon dioxide in a subterranean geologic formation, comprising:
   mixing an ionic liquid with the hydrocarbon fluid by injecting a composition comprising the ionic liquid into the subterranean geologic formation to form a first mixture, wherein the first mixture comprises a crude oil, $CO_2$, water and the ionic liquid, wherein the crude oil has a total concentration of asphaltenes of at least 5% by weight based on the total weight of the crude oil,
   wherein the ionic liquid is mixed with the hydrocarbon fluid in an amount effective to reduce the MMP of the hydrocarbon fluid and carbon dioxide by 5% to 17.27% and/or to reduce a first contact miscibility pressure (FCMP) of the hydrocarbon fluid and carbon dioxide by 5% to 32.61%, and
   wherein the ionic liquid is selected from the group consisting of 1-methyl-3-octylimidazolium chloride and 1-decyl-3-methylimidazolium chloride.

2. The method of claim 1, wherein less than or equal to 1 wt. % relative to the hydrocarbon fluid corresponds to the amount effective to reduce the MMP of the hydrocarbon fluid and carbon dioxide by 5% to 17.27% and/or to reduce the FCMP of the hydrocarbon fluid and carbon dioxide by 5% to 32.61%.

3. The method of claim 2, wherein the ionic liquid is 1-methyl-3-octylimidazolium chloride.

4. The method of claim 3, wherein 1-methyl-3-octylimidazolium chloride is mixed with the hydrocarbon fluid in an amount of 1 wt. % of the hydrocarbon fluid, and MMP of the hydrocarbon fluid and carbon dioxide is reduced by 10% to 17.27%.

5. The method of claim 3, wherein 1-methyl-3-octylimidazolium chloride is mixed with the hydrocarbon fluid in an amount of 1 wt. % of the hydrocarbon fluid, and FCMP of the hydrocarbon fluid and carbon dioxide is reduced by 15% to 30.14%.

6. The method of claim 3, wherein 1-methyl-3-octylimidazolium chloride is mixed with the hydrocarbon fluid in an amount of 0.1 wt. % of the hydrocarbon fluid, and MMP of the hydrocarbon fluid and carbon dioxide is reduced by 5% to 14.84%.

7. The method of claim 3, wherein 1-methyl-3-octylimidazolium chloride is mixed with the hydrocarbon fluid in an amount of 0.1 wt. % of the hydrocarbon fluid, and FCMP of the hydrocarbon fluid and carbon dioxide is reduced by 5% to 14.34%.

8. The method of claim 2, wherein the ionic liquid is 1-decyl-3-methylimidazolium chloride.

9. The method of claim 8, wherein 1-decyl-3-methylimidazolium chloride is mixed with the hydrocarbon fluid in an amount of 1 wt. % of the hydrocarbon fluid, and MMP of the hydrocarbon fluid and carbon dioxide is reduced by % 5% to 13.47%.

10. The method of claim 8, wherein 1-decyl-3-methylimidazolium chloride is mixed with the hydrocarbon fluid in an amount of 1 wt. % of the hydrocarbon fluid, and FCMP of the hydrocarbon fluid and carbon dioxide is reduced by 15% to 32.61%.

11. The method of claim 8, wherein 1-decyl-3-methylimidazolium chloride is mixed with the hydrocarbon fluid in an amount of 0.1 wt. % of the hydrocarbon fluid, and MMP of the hydrocarbon fluid and carbon dioxide is reduced by 5% to 12.16%.

12. The method of claim 8, wherein 1-decyl-3-methylimidazolium chloride is mixed with the hydrocarbon fluid in an amount of 0.1 wt. % of the hydrocarbon fluid, and FCMP of the hydrocarbon fluid and carbon dioxide is reduced by 10% to 21.92%.

13. The method of claim 1, wherein the mixing includes injecting the ionic liquid into a subterranean geologic formation comprising the crude oil, and injecting $CO_2$ into the subterranean geologic formation.

14. The method of claim 1, wherein the crude oil comprises asphaltene in an amount of at least 10% by weight based on the total weight of the crude oil.

15. The method of claim 14, wherein the crude oil comprises asphaltene in an amount of at least 30% by weight based on the total weight of the crude oil.

16. The method of claim 1, wherein the crude oil has a density in a range from 0.7 to 1.3 $g/cm^3$.

17. The method of claim 1, wherein the crude oil has a total acid number (TAN) less than or equal to 3.5 mgKOH/g.

18. The method of claim 1, wherein the crude oil has a TAN less than or equal to 1 mgKOH/g.

19. The method of claim 1, wherein the crude oil has a viscosity of less than or equal to 50,000 cP.

20. The method of claim 1, further comprising:
   determining an operating temperature of the hydrocarbon fluid; and
   characterizing the crude oil based on a density and an asphaltene content of the crude oil at the operating temperature to obtain an oil category,
   wherein the amount of ionic liquid injected is determined based on the operating temperature and the oil category.

* * * * *